United States Patent
Kumar et al.

(10) Patent No.: US 12,548,362 B2
(45) Date of Patent: Feb. 10, 2026

(54) METHOD AND SYSTEM FOR OPTICAL CHARACTER RECOGNITION (OCR)-FREE INFORMATION EXTRACTION FROM IMAGE-BASED DOCUMENTS

(71) Applicant: Dell Products L.P., Round Rock, TX (US)

(72) Inventors: Atul Kumar, Bangalore (IN); Sailendu Kumar Patra, Bangalore (IN); Saurabh Jha, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 359 days.

(21) Appl. No.: 18/183,523

(22) Filed: Mar. 14, 2023

(65) Prior Publication Data
US 2024/0312233 A1      Sep. 19, 2024

(51) Int. Cl.
*G06F 40/103*  (2020.01)
*G06F 40/169*  (2020.01)
*G06F 40/205*  (2020.01)
*G06V 10/82*   (2022.01)
*G06V 30/148*  (2022.01)
*G06V 30/18*   (2022.01)
(Continued)

(52) U.S. Cl.
CPC .......... *G06V 30/416* (2022.01); *G06F 40/103* (2020.01); *G06F 40/169* (2020.01); *G06F 40/205* (2020.01); *G06V 10/82* (2022.01); *G06V 30/148* (2022.01); *G06V 30/18* (2022.01); *G06N 3/0464* (2023.01)

(58) Field of Classification Search
CPC .... G06V 30/416; G06V 10/82; G06V 30/148; G06V 30/18; G06F 40/103; G06F 40/169; G06F 40/205; G06N 3/0464; G06N 3/045
See application file for complete search history.

(56) References Cited

U.S. PATENT DOCUMENTS 5,828,769 A  * 10/1998  Burns .................. G06V 30/248
                                                      340/5.1
10,162,794 B1 * 12/2018  Arel ....................... G06N 3/084
(Continued)

OTHER PUBLICATIONS

Dosovitskiy et al., "An Image is Worth 16x16 Words: Transformers for Image Recognition at Scale", Published as a conference paper at ICLR, 2021, arXiv:2010.11929v2 [cs.CV], Jun. 3, 2021 (22 pages).

*Primary Examiner* — Huo Long Chen
(74) *Attorney, Agent, or Firm* — Chamberlain, Hrdlicka, White, Williams & Aughtry; Aly Z. Dossa

(57) ABSTRACT

A method for information extraction from an image-based asset includes: generating, by an encoder, at least one image patch from the asset; generating, by the encoder, an input embedding for the at least one image patch; generating, by the encoder, an output embedding based on the input embedding; inferring, by a decoder, a detail of the image-based asset based on the output embedding and a formatted asset, in which the output embedding is sent by the encoder, wherein the formatted asset is sent by a parser; generating, by the decoder, a decoder output based on the detail, in which the detail comprises at least a feature and a second feature; converting, by a converter, the decoder output into an output asset, in which the decoder output is sent by the decoder; and sending, by the converter, the output asset to a user using a graphical user interface (GUI).

15 Claims, 11 Drawing Sheets

(51) Int. Cl.
*G06V 30/416* (2022.01)
*G06N 3/0464* (2023.01)

(56) References Cited

U.S. PATENT DOCUMENTS

| | | | |
|---|---|---|---|
| 11,763,581 B1* | 9/2023 | Gangeh | G06F 40/40 382/181 |
| 2019/0171908 A1* | 6/2019 | Salavon | G06V 10/82 |
| 2023/0217041 A1* | 7/2023 | Kim | H04N 19/70 375/240.26 |
| 2023/0267600 A1* | 8/2023 | Qu | G06T 7/001 382/141 |

* cited by examiner

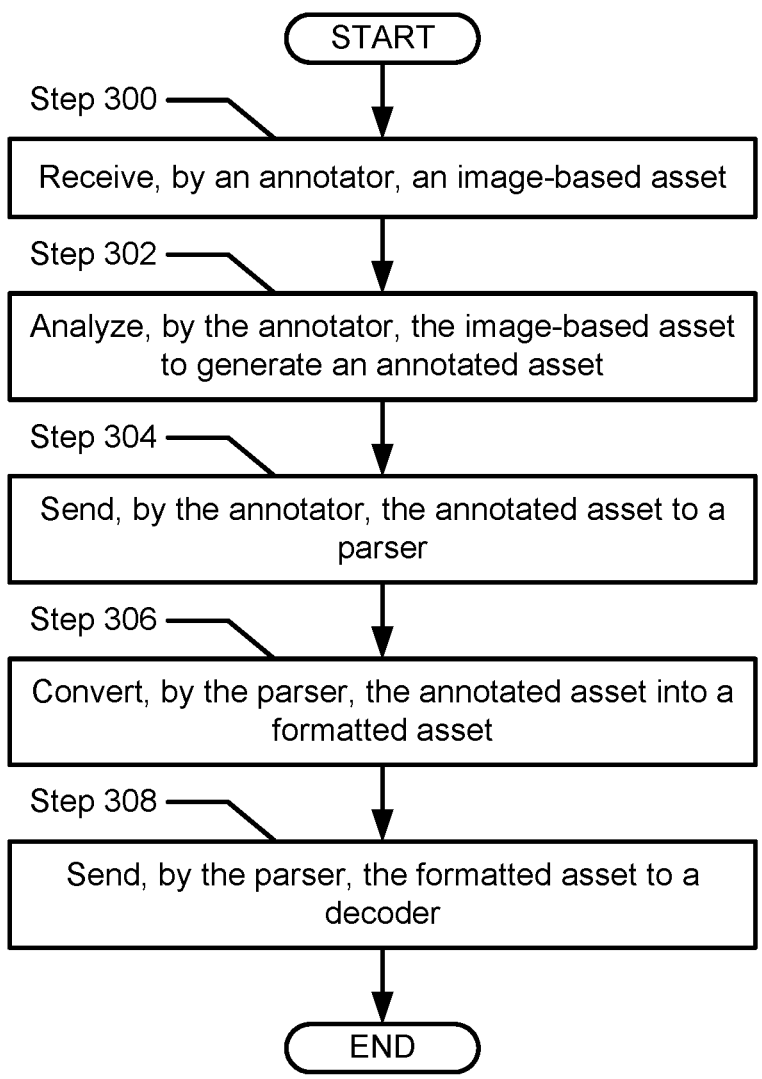
FIG. 3.1

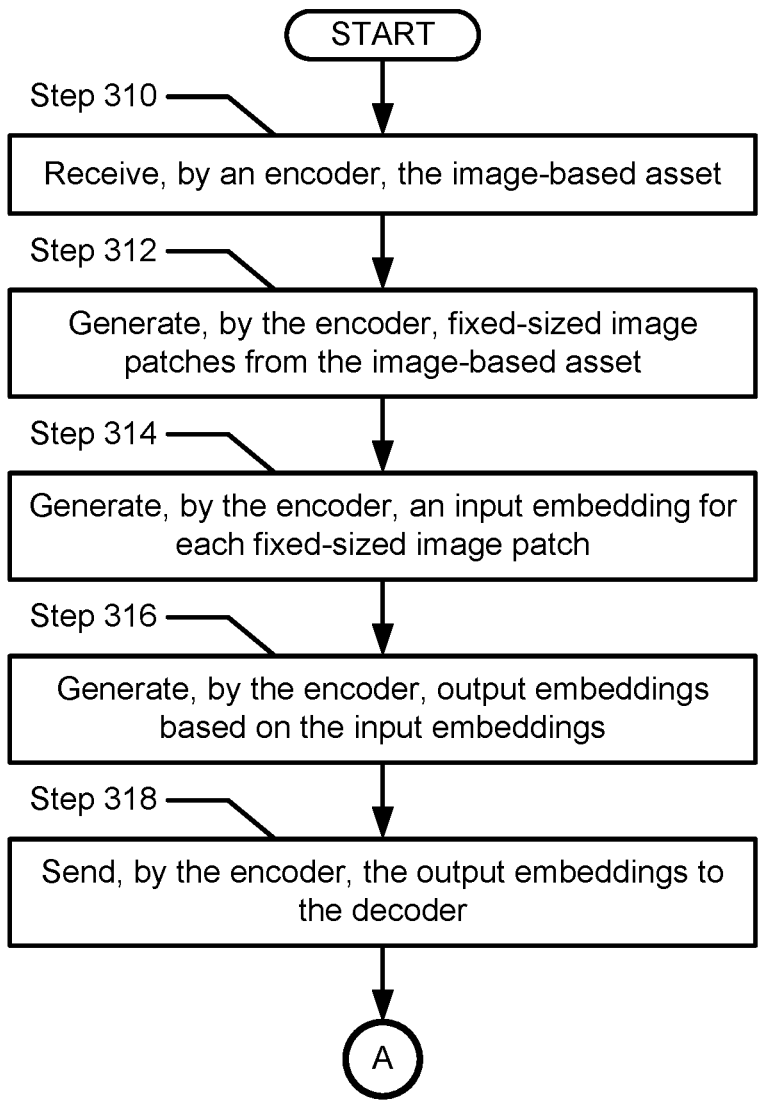
FIG. 3.2

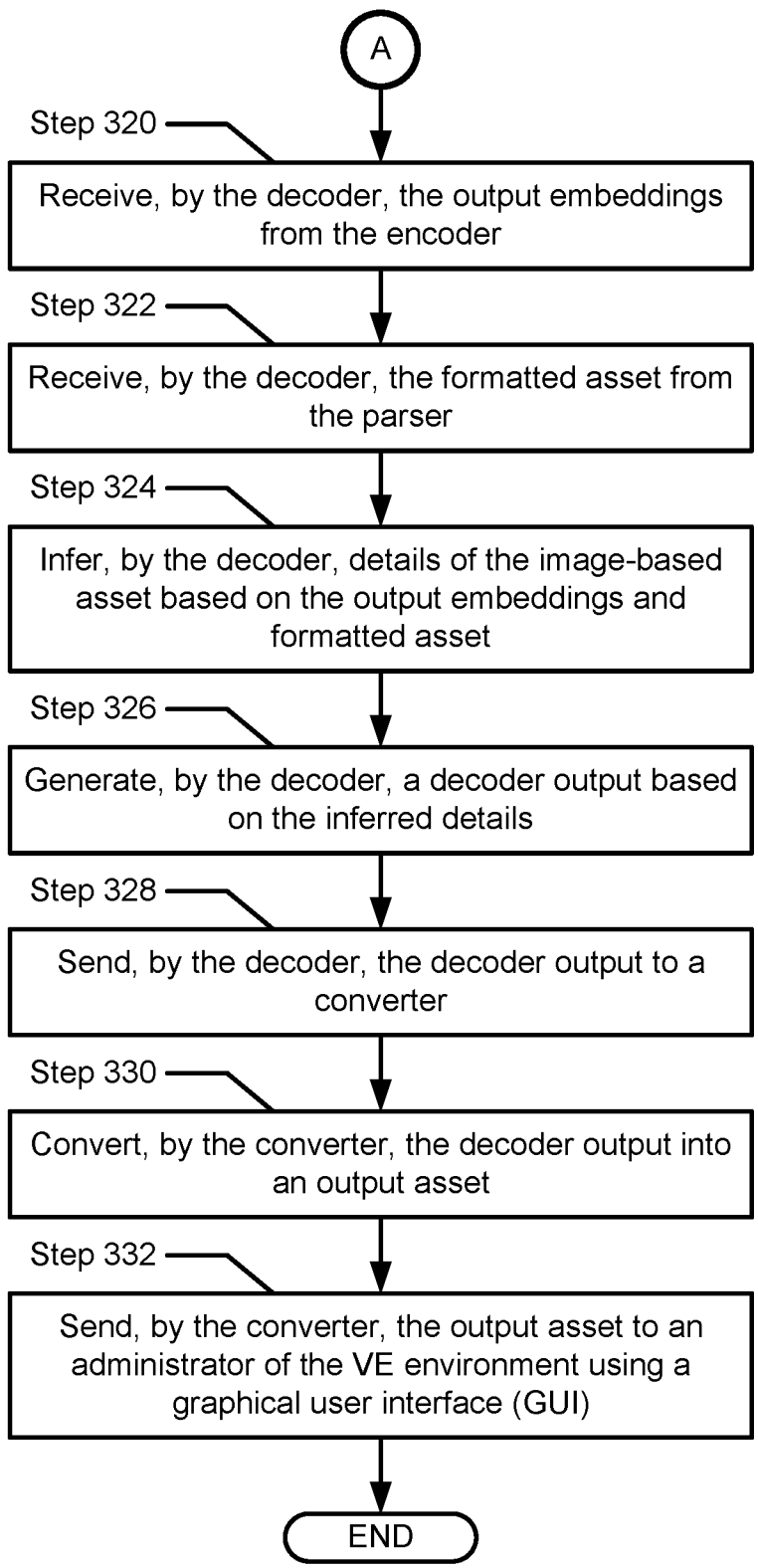
FIG. 3.3

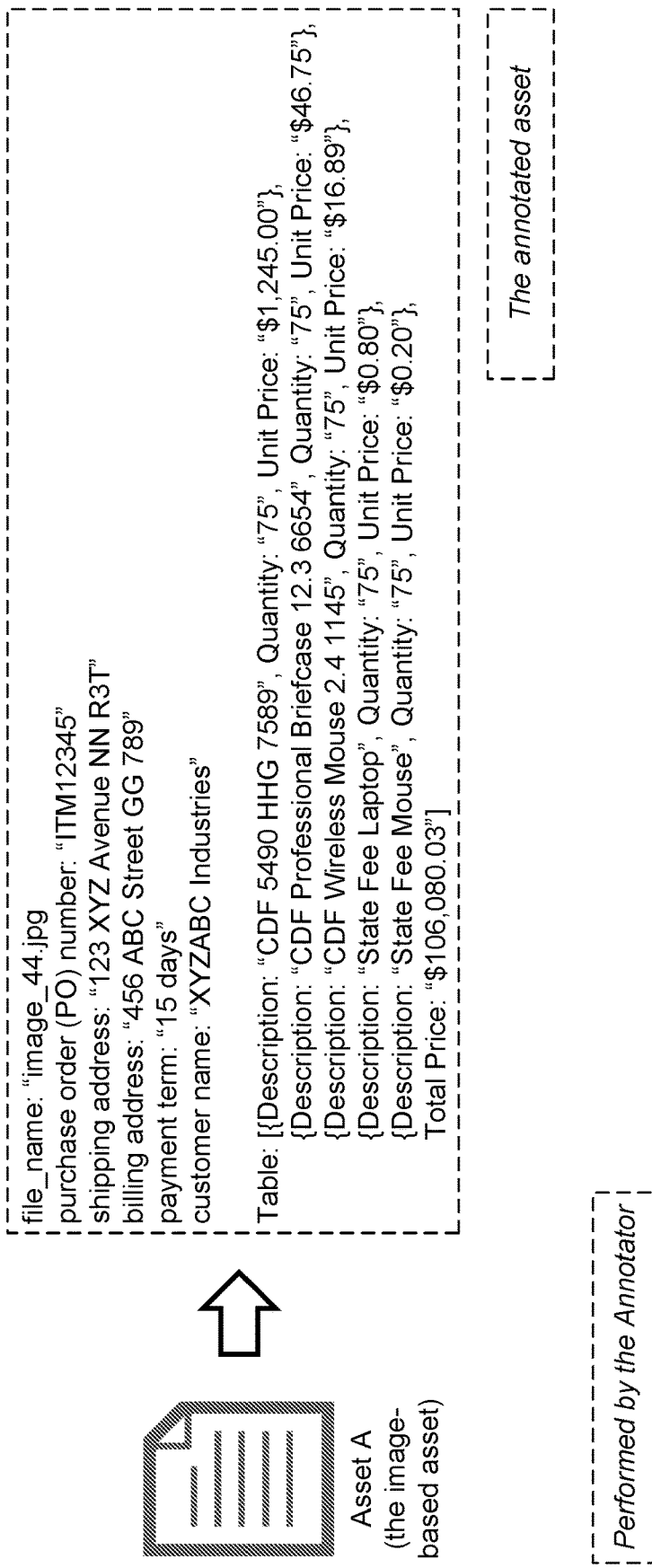
FIG. 4.1

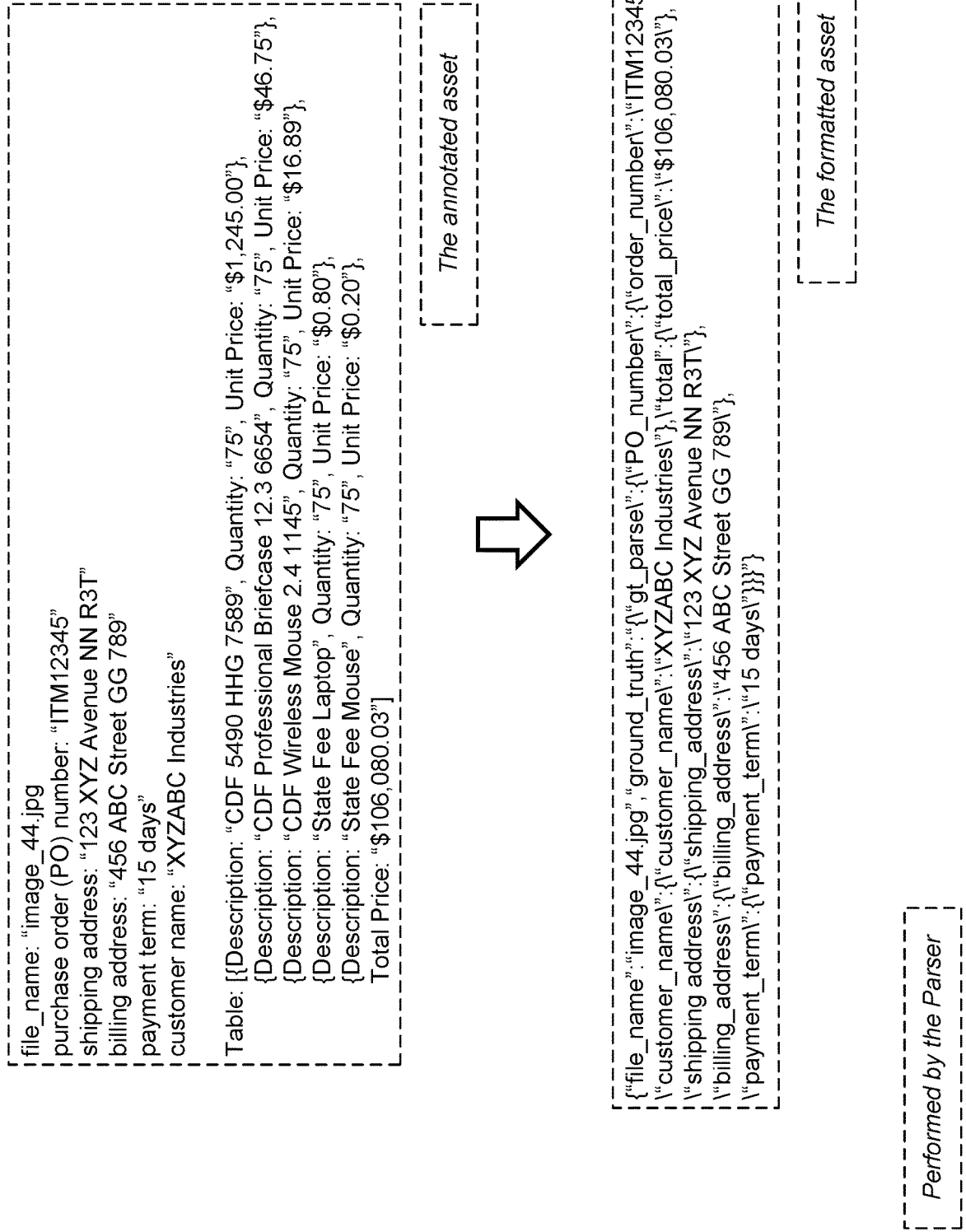
FIG. 4.2

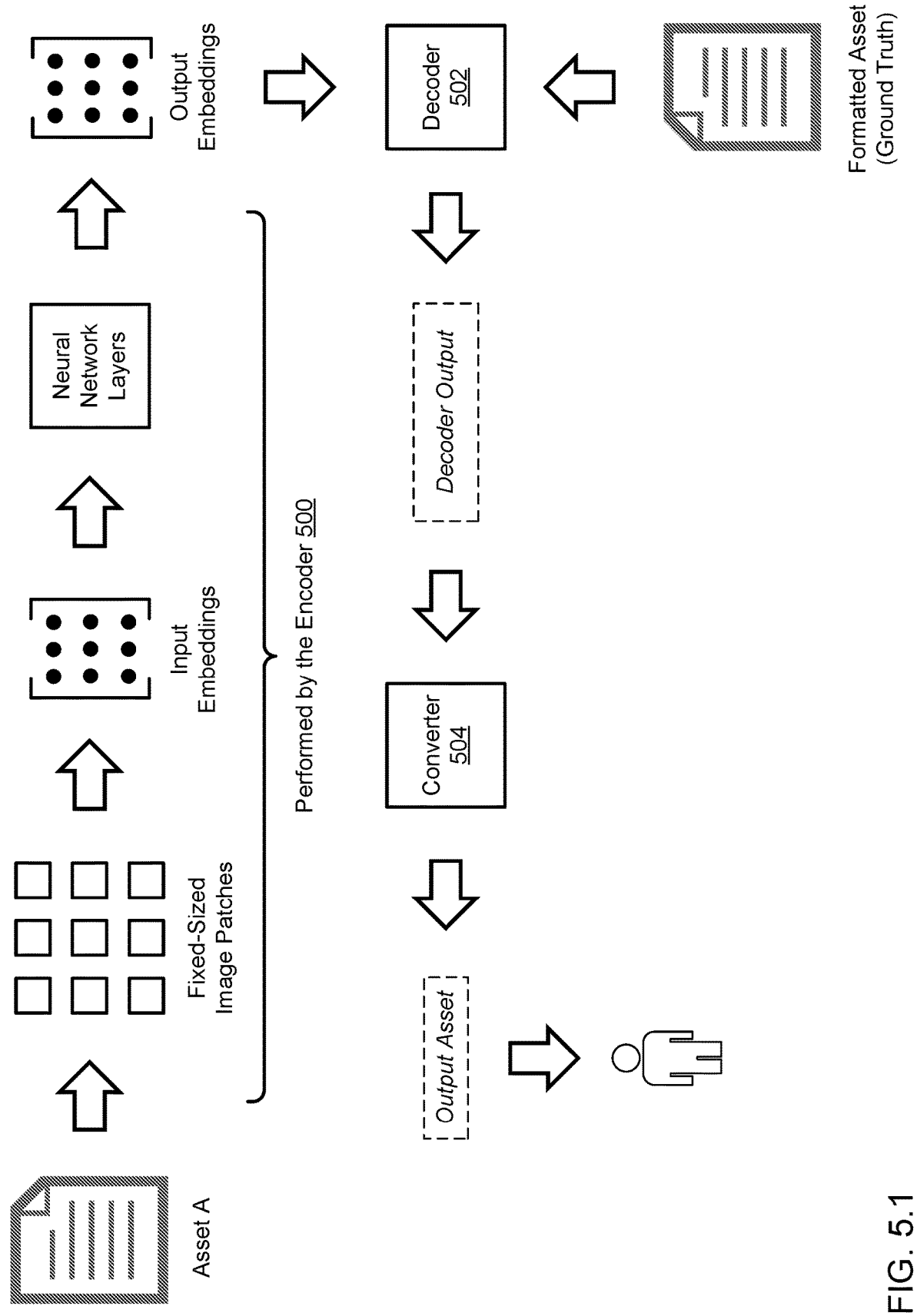
FIG. 5.1

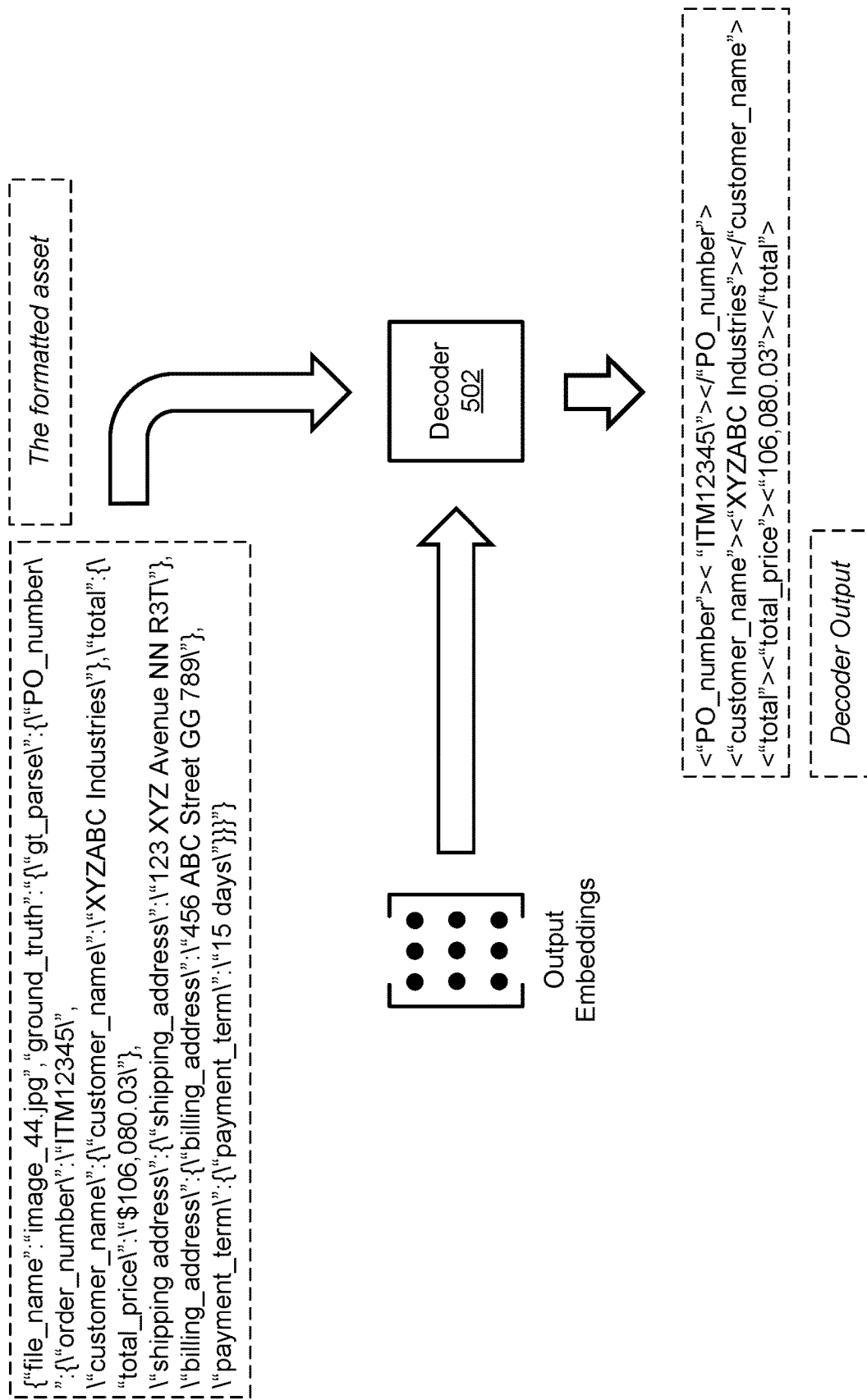
FIG. 5.2

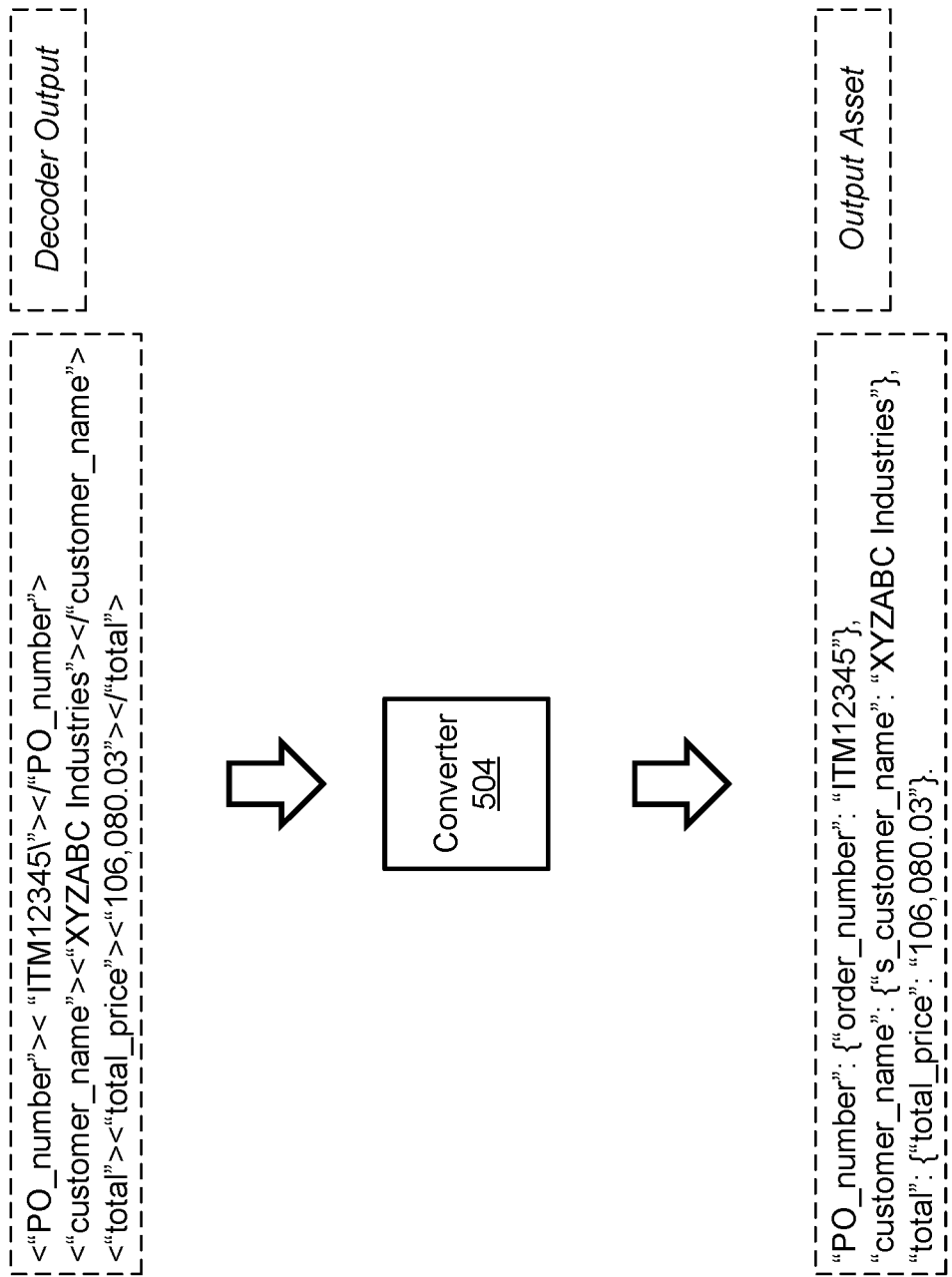
FIG. 5.3

METHOD AND SYSTEM FOR OPTICAL CHARACTER RECOGNITION (OCR)-FREE INFORMATION EXTRACTION FROM IMAGE-BASED DOCUMENTS

BACKGROUND

Neural networks are machine learning (ML) models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example, and are not meant to limit the scope of the claims.

FIGS. 3.1-3.3 show a method for OCR-free information extraction from image-based documents in accordance with one or more embodiments disclosed herein.

FIG. 4.1 shows an example annotated asset in accordance with one or more embodiments disclosed herein.

FIG. 4.2 shows an example annotated asset and an example formatted asset in accordance with one or more embodiments disclosed herein.

FIGS. 5.1-5.3 show an example use case in accordance with one or more embodiments disclosed herein.

DETAILED DESCRIPTION

Figure 1:
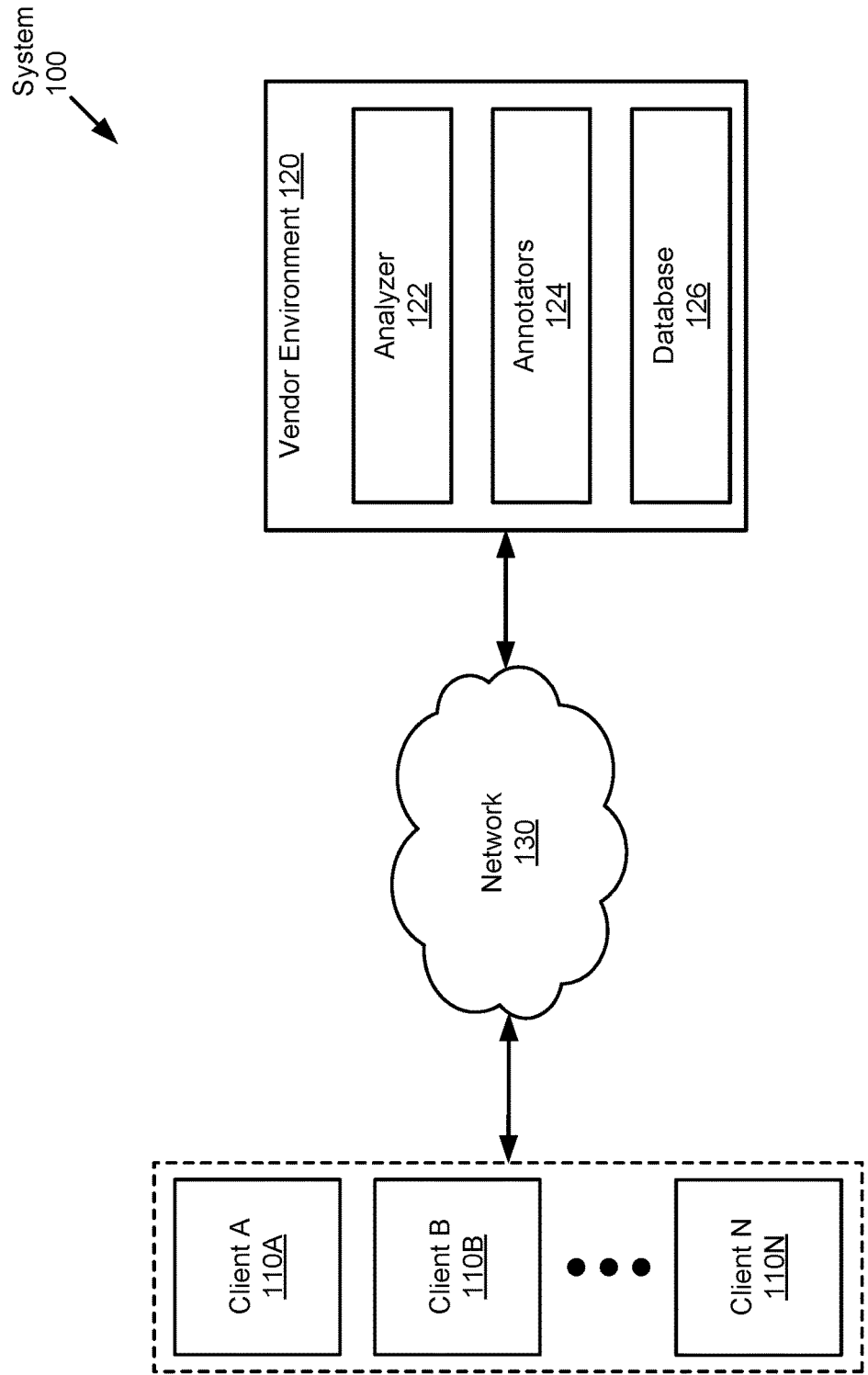
FIG. 1 shows a diagram of a system in accordance with one or more embodiments disclosed herein.

Specific embodiments disclosed herein will now be described in detail with reference to the accompanying figures. In the following detailed description of the embodiments disclosed herein, numerous specific details are set forth in order to provide a more thorough understanding of one or more embodiments disclosed herein. However, it will be apparent to one of ordinary skill in the art that the one or more embodiments disclosed herein may be practiced without these specific details. In other instances, well-known features have not been described in detail to avoid unnecessarily complicating the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, corporates (e.g., organizations) are interested in processing unstructured image-based documents with layout information (e.g., scanned documents, image-based portable document format (PDF) documents, image-based Microsoft® Word documents, image-based letters, image-based commercial invoices, etc.) for various different tasks. For example, an organization may execute an operation that extracts information from images of purchase orders received from customers (e.g., users, entities, etc.) to automate one or more parts of an order booking process. During that order booking process, if any unrelated/incorrect information is entered (from the purchase orders), that information may impact the overall process and may result in order cancellation leading to customer dissatisfaction. Separately, the aforementioned issue not only triggers order cancellation, but also results in incorrect invoices that in turn causes rebilling of invoices.

In most cases, it may be challenging to (i) detect and extract words from image-based documents, and (ii) employ image-based documents (e.g., image-based data) in ML/artificial intelligence (AI) models for various different tasks/purposes because (a) image-based data may not be directly used as input, (b) ML/AI models may require texts of image-based data as input, and (c) ML/A models may need to be fed with image-based data that has a certain data format(s) to operate properly (where conventional approaches are not sufficient to provide these data formats because of a high variability in, for example, skewness, image quality, and text agglomeration).

Further, processing image-based documents (e.g., purchase orders) require complex steps to follow, such as reading text and providing a holistic view of a purchase order. Recent ML/AI models-based developments (e.g., visual document understanding (VDU) based methods, OCR-based methods, etc.) in digital transformation have improved data management of image-based documents, in which, for example, OCR-based methods have improved efficiency and compliance when managing (or processing) internal and/or customer documents (e.g., purchase orders). The performance of such OCR-based methods has been promising; however, they have suffered from (i) high computational costs with respect to handling OCR, (ii) inflexibility of OCR models for certain types of documents or languages, and (iii) error (e.g., an error that has occurred while extracting information and/or bounding boxes) propagation to subsequent steps in an ongoing task/process.

For at least the reasons discussed above, without requiring resource (e.g., time, engineering, etc.) intensive efforts (i) to extract key and detailed data (e.g., digital information) from unstructured image-based documents (e.g., assets) that contains changing layout and language, (ii) to improve an end-to-end task (e.g., an order booking process) while automating data capture steps using ML/AI models, and (iii) to automate extraction of words and bounding boxes from image-based documents to infer and classify relevant parts of each of the image-based documents' content, a fundamentally different approach (e.g., an OCR-free, quick, accurate, and end-to-end ML/AI model-based approach for various data extraction-related tasks) is needed. Embodiments disclosed herein relate to methods and systems to provide a simple yet effective OCR-free end-to-end architecture for information extraction (from various different image-based assets) with a pre-training objective (i.e., cross-entropy loss). More specifically, an encoder may first generate at least one image patch from an image-based asset. The encoder may then generate an input embedding for the at least one image patch, in which the input embedding is a low-dimensional vector representation of the at least one image patch. Thereafter, the encoder may generate an output embedding based on the input embedding, in which the output embedding is a high-dimensional vector representation of the at least one image patch that specifies a presence of a feature contained in at least one image patch.

Further, a decoder may infer a detail of the image-based asset based on the output embedding and a formatted asset, in which the output embedding is sent by the encoder (to the decoder) and the formatted asset is sent by a parser (to the decoder). The decoder may then generate a decoder output based on the detail, in which the detail includes at least the feature and a second feature. A converter may convert the decoder output into an output asset, in which the decoder output is sent by the decoder (to the converter). Finally, the converter may send the output asset to a user using a graphical user interface (GUI).

As a result of the processes discussed below, one or more embodiments disclosed herein advantageously ensure that: (i) the challenges (e.g., a period of time that is required for OCR pre-processing steps (e.g., steps for image cleaning before providing an image to an OCR engine), high computational costs with respect to handling OCR, inflexibility of OCR models for certain types of documents, domains, or languages (which may lead to poor generalization ability), error propagation to subsequent steps in an ongoing task (which may become more severe in languages with complex character sets, for example Korean or Chinese), a post-OCR correction module requirement (which may increase an overall system size and maintenance cost), etc.) of OCR-based methods are minimized (or circumvented) towards analyzing/scrutinizing a complex layout document in a resource- and cost-effective way, (ii) a raw input image-based asset (which may contain a high variability in skewness, image quality, and text agglomeration) is directly mapped into a desired structured output without OCR (to automatically extract useful information from such input that contains changing layout and language), (iii) the OCR-free architecture is trained in an end-to-end fashion (so that the architecture may be extended to a multi-lingual setting), and (iv) the OCR-free architecture is trained gradually from "how to read" to "how to understand".

The following describes various embodiments disclosed herein.

FIG. 1 shows a diagram of a system (100) in accordance with one or more embodiments disclosed herein. The system (100) includes any number of clients (e.g., Client A (110A), Client B (110B), Client N (110N), etc.), a production host (not shown), a network (130), an analyzer (122), any number of annotators (124), and a database (126). The system (100) may include additional, fewer, and/or different components without departing from the scope of the embodiments disclosed herein. Each component may be operably connected to any of the other components via any combination of wired and/or wireless connections. Each component illustrated in FIG. 1 is discussed below.

In one or more embodiments, the clients (e.g., Client A (110A), Client B (110B), Client N (110N), etc.), the production host, the network (130), and the database (126) may be physical or logical devices, as discussed below. In one or more embodiments, the clients (e.g., Client A (110A), Client B (110B), Client N (110N), etc.) and the production host may collectively be referred to as "components of a client environment (CE) (not shown)". Similarly, in one or more embodiments, the analyzer (122) and the database (126) may collectively be referred to as "components of a vendor environment (VE) (120)".

While FIG. 1 shows a specific configuration of the system (100), other configurations may be used without departing from the scope of the embodiments disclosed herein. For example, although the clients (e.g., Client A (110A), Client B (110B), Client N (110N), etc.) and the VE (120) are shown to be operatively connected through the network (130), the clients (e.g., Client A (110A), Client B (110B), Client N (110N), etc.) and the VE (120) may be directly connected. As yet another example, although the database (126) is shown as part of the VE (120), the database (126) may be operatively connected to the VE (120) (e.g., the database (126) may be implemented separately in the form of hardware, software, or any combination thereof).

Further, the functioning of the analyzer (122) and the clients (e.g., Client A (110A), Client B (110B), Client N (110N), etc.) is not dependent upon the functioning and/or existence of the other components (e.g., devices) in the system (100). Rather, the analyzer (122) and the clients (e.g., Client A (110A), Client B (110B), Client N (110N), etc.) may function independently and perform operations locally that do not require communication with other components. Accordingly, embodiments disclosed herein should not be limited to the configuration of components shown in FIG. 1.

As used herein, "communication" may refer to simple data passing, or may refer to two or more components coordinating a job.

As used herein, the term "data" is intended to be broad in scope. In this manner, that term embraces, for example (but not limited to): data segments that are produced by data stream segmentation processes, data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the disclosure are not limited to any particular form of representing and storing data or other information. Rather, such principles are equally applicable to any object capable of representing information.

In one or more embodiments, the system (100) may deliver computing power, storage capacity, and data protection (e.g., software-defined data protection) as a service to users of the clients (e.g., Client A (110A), Client B (110B), Client N (110N), etc.). The system (100) may also represent a comprehensive middleware layer executing on computing devices (e.g., 600, FIG. 6) that supports virtualized application environments. In one or more embodiments, the system (100) may support one or more virtual machine (VM) environments (e.g., the production host), and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

As used herein, "computing" refers to any operations that may be performed by a computer, including (but not limited to): computation, data storage, data retrieval, communications, etc.

As used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user of a client (described below). The resource may be delivered to the client via, for example (but not limited to): conventional installation, a method for streaming, a VM executing on a remote computing device, execution from a removable storage device connected to the client (such as universal serial bus (USB) device), etc.

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a NAS, a database, an application, a collection of microservices, a file system (FS), small workloads with lower priority workloads (e.g., FS host data, operating system (OS) data, etc.), medium workloads with higher priority (e.g., VM with FS data, network data management protocol (NDMP) data, etc.), large workloads with critical priority (e.g., mission critical application data), etc.

As used herein, a "container" is an executable unit of software in which an application code is packaged, along with its libraries and dependencies, so that it can be executed anywhere. To do this, a container takes advantage of a form of OS virtualization in which features of the OS are leveraged to both isolate processes and control the portion of central processing unit (CPU), memory, and disk that those processes have access to.

Comparing to a VM, a container does not need to include a guest OS in every instance and may simply leverage the features and resources of a host OS. For example, instead of virtualizing the underlying hardware components, a container virtualizes the OS, so the container includes only the application (and its libraries and dependencies). The absence of the guest OS makes a container lightweight, fast, and portable.

Further, comparing to a conventional data center scenario, in which (i) all the necessary hardware and software components are needed to be acquired and (ii) an entire infrastructure team is needed to build and configure all aspects of the infrastructure (which may take weeks), the above process may take only minutes with containers. Containers may also include functionality to: (i) perform disaster recovery (with this functionality, even if multiple containers fail, applications may continue to execute uninterrupted), (ii) perform seamless scaling up and down with little to no intervention on the part of a user (with this functionality, as demand grows, containers may eliminate the need to add more servers or allocate more resources in a costly way), and (iii) reduce labor-intensive efforts and costs, in which containers may require very few personnel to manage and monitor applications and instances. One of ordinary skill will appreciate that containers may perform other functionalities without departing from the scope of the embodiments disclosed herein.

As used herein, a "file system" is a method that an OS (e.g., Microsoft® Windows, Apple® MacOS, etc.) uses to control how data is named, stored, and retrieved. For example, once a user has logged into a computing device (e.g., 600, FIG. 6), the OS of that computing device uses the file system (e.g., new technology file system (NTFS), a resilient file system (ReFS), a third extended file system (ext3), etc.) of that computing device to retrieve one or more applications to start performing one or more operations (e.g., functions, tasks, activities, jobs, etc.). As yet another example, a file system may divide a volume (e.g., a logical drive) into a fixed group of bytes to generate one or more blocks of the volume.

In one or more embodiments, as being implemented as an a physical computing device or a logical computing device, the analyzer (122) may provide one or more computing environments (or an OCR-free neural network system) that is configured for, at least: (i) workload placement collaboration, (ii) computing resource (e.g., processing, storage/memory, virtualization, networking, etc.) exchange, and (iii) processing an unstructured image-based document (which may be a semi-structured or structured image-based document) and to generate an output asset (see FIG. 5.3) that represents a prediction about the unstructured image-based document. The analyzer (122) may be configured to perform any appropriate ML/AI related task (discussed below) using the unstructured image-based document (or simply the "unstructured image"). To provide the aforementioned services, the analyzer (122) may include functionality to generate and issue instructions to any other component of the system (100). The analyzer (122) may also generate instructions in response to requests from other entities.

In one or more embodiments, an image may be any appropriate type of image. For example, the image may be a two-dimensional image, e.g., a two-dimensional image that has multiple channels (e.g., a truecolor image). As yet another example, the image may be a hyperspectral image that represents a continuous spectrum of wavelengths for each pixel in the image. As yet another example, the image may be a purchase order received from a user of a client (over the network (130)). As yet another example, the image may be a point cloud (generated by a light detection and ranging (LIDAR) sensor) that includes multiple points, in which each point has a respective coordinate, e.g., in a three-dimensional or a higher-dimensional coordinate space. As another example, the image may be a medical image (e.g., computer tomography (CT) image, a magnetic resonance imaging (MRI) image, an ultrasound image, an X-ray image, a fluoroscopy image, a positron-emission tomography (PET) image, etc.) generated by a medical imaging device.

Although the below description refers to generating image patches of an image that each includes respective "pixels" of the image, it is to be understood that the analyzer (122) may generate image patches that include components of the image that are of any appropriate type. For example, if an image is a point cloud, then each image patch of the image may include a subset of the points in the point cloud. As yet another example, if an image is an MRI image that includes multiple voxels in a three-dimensional voxel grid, then each image patch of the image may include a subset of the voxels in the voxel grid.

In one or more embodiments, as described above, the analyzer (122) may provide an end-to-end (i.e., self-contained) OCR-free neural network system for general understanding of images. The analyzer (122) may include a transformer-based visual encoder (e.g., 210, FIG. 2), a textual decoder (e.g., 220, FIG. 2), a parser (e.g., 230, FIG. 2), and a converter (e.g., 240, FIG. 2), in which the OCR-free neural network system uses the aforementioned components for (i) extracting features (described below) from a given document image (e.g., a type of image processing) and (ii) mapping the extracted features into a sequence of tokens (or subword tokens) to generate an output asset in a desired structured format (e.g., a JavaScript Object Notation (JSON) format, a human-readable format, etc.). The overall process performed by the OCR-free neural network system is illustrated in FIG. 5.1.

In one or more embodiments, a key feature may specify (or include), for example (but not limited to): an identifier of an image-based asset, an identifier of a vendor, an identifier of a user, a purchase order number, a shipping address, a billing address, a unit price of a hardware component, a shape of a text included in an image-based asset, layout information of an image-based asset, an edge of a text included in an image-based asset, etc.

In one or more embodiments, an ML/AI model(s) executing on one or more components (e.g., the encoder (e.g., 210, FIG. 2), the decoder (e.g., 220, FIG. 2), etc.) of the analyzer may be trained (in conjunction with an annotator of the annotators (124), described below) to read/capture all text in an image in a reading order (e.g., from top-left to bottom-right). The objective of this training process is to minimize cross-entropy loss of a next token prediction by jointly conditioning on the image and previous contexts, in which this process may be interpreted as a pseudo-OCR process. In one or more embodiments, the aforementioned components of the analyzer (122) may be trained easily (e.g., in an end-to-end manner) because these components are transformer-based components.

In one or more embodiments, while training the aforementioned components, various different types of images/methods may be utilized. For example, the images may be in different languages (e.g., English, Chinese, Japanese, Korean, etc.), in which image rendering models (e.g., heuristic rule-based pattern generation models) may be applied to the images to mimic real documents. As yet another example, as images for training, each image may include several components, such as background, text, and layout, in which (i) the background may be sampled from ImageNet visual database and a texture of an image may be sampled from collected paper purchase orders (in order to make the texture realistic, random elastic distortion or Gaussian noise may be applied), (ii) the text (e.g., words, phrases, fonts, etc.) may be sampled from the Internet (where text colors may be randomly assigned), and (iii) the layout may be generated via a rule-based model that randomly stacks grids.

In one or more embodiments, after the aforementioned training steps (i.e., pre-training steps of the training process such as text reading) are completed (said another way, after the ML/AI model(s) executing on the components learns how to read the texts by predicting the next words by conditioning jointly on the image and previous text contexts), the models may be trained (by adjusting some hyperparameters and monitoring the edit distance over token sequences) on how to understand an image (i.e., the "fine-tuning" part of the training process), in which all downstream tasks (e.g., fine-tuned transformer tasks) may be interpreted as a JSON prediction problem. Thereafter, to confirm that the models fully understand/capture complex layouts and contexts in image-based documents, the models may be trained with respect to "document information extraction" tasks on various real document images obtained from, including (but not limited to): public benchmark datasets, industrial datasets, the Consolidated Receipt Dataset (CORD) (where, for example, (i) the letters of receipts is in Latin alphabet, (ii) the number of unique fields is 30 containing menu name, count, total price, etc., (iii) complex structures (i.e., nested groups and hierarchies such as items→item→{name, count, price}) are included, etc.), a purchase order dataset based on real products (where, for example, (i) the letters of receipts is in Latin alphabet or Chinese alphabet, (ii) the number of unique fields is 15 containing store information, shipping address information, count, price information, company address information, an identity of a customer, etc., (iii) complex structures are included, etc.), etc.

In one or more embodiments, each training dataset may be generated from a respective set of training images; that is, each training example in a particular training dataset may be generated from a respective training image from the set of training images corresponding to the training dataset. In one or more embodiments, each training dataset may be generated from the same set of images; in some other embodiments, different training datasets may be generated from different set of images.

In one or more embodiments, for the "document information extraction" tasks, the models may target to map each document to a structured form of information that is consistent with target ontology, in which the models should not only read the characters (and words) accurately, but also understand the layouts and semantics to infer the groups and nested hierarchies among the texts (such as items→item→{name, count, price}).

In one or more embodiments, the VE (120) may include a training system (not shown) that includes a training engine (not shown). The training engine may be configured to obtain output(s) of the trained components, determine errors related to the components, and generate a parameter update for the components according to the errors. In one or more embodiments, the training engine may generate the parameter update using any appropriate training method. For example, the training engine may use one or more of supervised learning, unsupervised learning, semi-supervised learning, self-supervised learning, distillation learning, or adversarial learning.

For example, in implementations in which the training system executes supervised learning using a training dataset that includes one or more formatted assets (generated by the parser), the training engine may determine a difference between an output asset and the corresponding formatted asset. The training engine may then generate a parameter update by backpropagating an error through the corresponding neural network and performing stochastic gradient descent.

In one or more embodiments, while performing one or more operations (e.g., information extraction from an image-based document that contains varying language and layout) requested by a user (or an administrator) of the VE (120), the analyzer (122) may include functionality to request and use resources (e.g., data, computing resources, etc.) available in the VE (120). Additional details about the resources (e.g., processing resources, networking resources, etc.) are described below. In one or more embodiments, the administrator may be a user with permission to make changes on the analyzer (122) that will affect other users of the analyzer (122).

In one or more embodiments, in order to provide the above-mentioned functionalities, the analyzer (122) may need to communicate with other components of the system (100) (e.g., the production host, the database (126), etc.) with minimum amount of latency (e.g., with high-throughput (e.g., a high data transfer rate) and sub-millisecond latency). For this reason, representational state transfer application programming interfaces (REST APIs) may be used to enable communication between the analyzer and the components. As used herein, a "REST API" is an interface that two computing devices use to exchange data securely over the Internet (or to exchange data internally). More specifically, the term "REST" defines a set of rules and constraints (not a protocol or a standard) that need to be followed when building a communication path(s). Any computing device that adheres to those rules and constraints will be able to communicate via a set of uniform, shared, and stateless (or stateful) operators and requests. APIs denote the underlying code that, if it conforms to the set of rules and constraints, allows computing devices to communicate with one another.

As used herein, an "API" represents a collection of methods and procedures (e.g., retrieving information about an API source, updating the API source, etc.) that define how applications or computing devices can connect to and communicate with each other. The collection of methods and procedures may be designed and configured to facilitate a computing device's connection (e.g., access) to one another. In general, the computing device performing the accessing is called "the client", and the computing device containing a resource is called "the server".

In operation, REST APIs use Hypertext Transfer Protocol (HTTP) to communicate. More specifically, REST APIs communicate via HTTP to perform standard database functions such as, for example, creating, reading, updating, and deleting records within a resource. For example, a well-designed REST API is similar to a webpage executing on a web browser with built-in HTTP functionality.

As used herein, "HTTP" is a request/response protocol that is used in cases in which a synchronous request/response is required. This means that computing devices making requests via REST APIs must be designed to expect an immediate response. If the client receiving the response is down, the sending service may be blocked while it awaits for the response. To prevent this, failover and error handling logic may be applied to (or built into) both applications.

One of ordinary skill will appreciate that the analyzer (122) may perform other functionalities without departing from the scope of the embodiments disclosed herein. In one or more embodiments, the analyzer (122) may be configured to perform all, or a portion, of the functionalities described in FIGS. 3.1-3.3. Additional details about the analyzer are described below in reference to FIG. 2.

Figure 6:
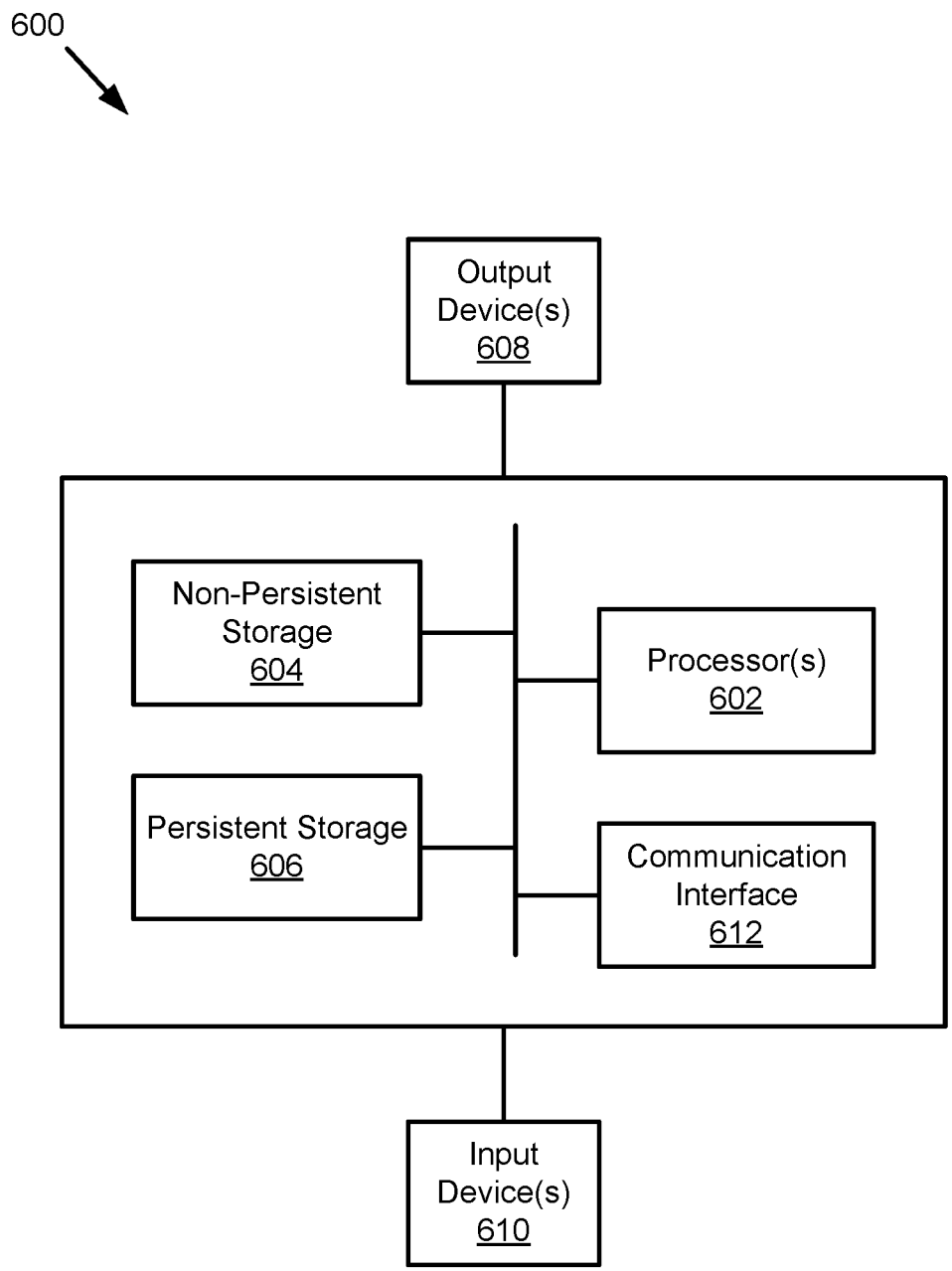
FIG. 6 shows a diagram of a computing device in accordance with one or more embodiments disclosed herein.

In one or more embodiments, the analyzer (122) may be implemented as a computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., random access memory (RAM)), and persistent storage (e.g., disk drives, solid-state drives (SSDs), etc.). The computing device may include instructions, stored in the persistent storage, that when executed by the processor(s) of the computing device cause the computing device to perform the functionality of the analyzer (122) described throughout the application.

Alternatively, in one or more embodiments, the analyzer (122) may be implemented as a logical device. The logical device may utilize the computing resources of any number of computing devices to provide the functionality of the analyzer (122) described throughout the application.

As discussed above, based on the objective of the training process, the models may be gradually trained (from "how to read the text" to "how to understand the context") based on a "transformer encoder-decoder architecture". To support the training process, a "teacher-forcing training approach" may also be implemented (because in some cases, the OCR-free end-to-end architecture may have limitations to annotate images of documents). As used herein, the "teacher-forcing training approach" is a semi-automatic model training strategy that uses a ground truth (see FIG. 5.1) as input instead of model output from a previous time step.

In the "teacher-forcing training approach", the annotators (124) (e.g., human beings) may obtain (or receive) an image (e.g., a scan of a purchase order) and manually prepare an annotated asset (that includes text annotations of the image) after opening the image. Even though the annotators (124) are trained with large-scale real document image data (e.g., Illinois Institute of Technology Complex Document Information Processing (IIT-CDIP) Test Collection), as part of this process, the annotators (124) may have a tendency to make mistakes while preparing the ground truth (i.e., the actual key field values such as values of shipping address, total cost, purchase order number, etc.) in parsing format, because the models may need to be fed with an image that has a certain data format to operate properly. For this reason and to make the annotation process simpler and error-free (said another way, to reduce the complexity of the annotation process), while generating the annotated asset (see FIG. 4.1), the annotators (124) may simply write a label and its value separated by a colon (e.g., "file_name: image_44.jpg", "purchase order number: ITM12345", "payment term: 15 days", etc.). Thereafter, the annotators (124) may send the annotated asset to a parser (e.g., 230, FIG. 2) (to be processed for the desired structured format of information).

In one or more embodiments, upon receiving the annotated asset from the annotators (124), the parser (e.g., 230, FIG. 2) may employ a set of linear, non-linear, and/or ML/AI models (e.g., a parsing script) to convert the annotated asset (e.g., a text file that has a simple format) into a formatted asset (by appending each annotation into a final JSON file that has a complex format). The parser (e.g., 230, FIG. 2) may then send the formatted asset (see FIG. 4.2) to the decoder (e.g., 220, FIG. 2) (see FIG. 5.1) to train the models.

One of ordinary skill will appreciate that the annotators (124) may perform other functionalities without departing from the scope of the embodiments disclosed herein. In one or more embodiments, the annotators (124) may be configured to perform all, or a portion, of the functionalities described in FIG. 3.1.

In one or more embodiments, the database (126) may be a fully managed cloud (or local) database (or any logical container) that acts as a shared storage or memory (simply storage/memory) resource (discussed below) that is functional to store unstructured and/or structured data. Further, the database (126) may also occupy a portion of a physical storage/memory device or, alternatively, may span across multiple physical storage/memory devices.

In one or more embodiments, the database (126) may be implemented using physical devices that provide data storage services (e.g., storing data and providing copies of previously stored data). The devices that provide data storage services may include hardware devices and/or logical devices. For example, the database (126) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the database (126) may include a memory device (e.g., a dual in-line memory device), in which data is stored and from which copies of previously stored data are provided. As yet another example, the database (126) may include a persistent storage device (e.g., an SSD), in which data is stored and from which copies of previously stored data is provided. As yet another example, the database (126) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the database (126) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the database (126) may store/log/record (temporarily or permanently) unstructured and/or structured data that may include (or specify), for example (but not limited to): an index of an asset (e.g., a file, a folder, etc.), an unstructured image-based document, an image patch of an image, a public benchmark dataset, an industrial dataset, the CORD dataset, a purchase order dataset based on real products, an annotated asset, a formatted asset, a decoder output, an output asset, recently obtained customer information (e.g., records, credentials, etc.), a cumulative history of initiated model training operations (e.g., sessions) over a prolonged period of time, a cumulative history of received purchase orders over a prolonged period of time, a documentation that indicates a set of jobs (e.g., a purchase order job, a product deployment job, etc.) that has been generated, a documentation that indicates a status of a job (e.g., how many jobs are still active, how many jobs are completed, etc.), a set of service level agreements (SLAs) (e.g., an agreement that indicates a period of time required to retain data available in the database (126)), one or more policies/rules for the operation (or configuration) of any portion of the analyzer (122) (to manage functions/operations performed by the analyzer (122)), one or more policies/rules for the operation of the annotators (124) (to manage functions/operations performed by the annotators (124)), a data protection policy (e.g., an SLA, an affinity-based backup policy, a data protection policy that dictates 30 days retention at storage, etc.) implemented by an administrator of the database (126) (for example, to protect the production host, to perform a rapid recovery, etc.), a configuration setting of that policy, a number of each type of a set of data protection policies implemented by an administrator of the database (126), recently obtained customer activity records, a cumulative history of customer activity records obtained over a prolonged period of time, one or more details of a received purchase order, an identifier of the image-based asset, an identifier of a vendor, an identifier of a customer, a purchase order number, a shipping address, a billing address, a unit price of a hardware component, a shape of a text included in an image-based asset, layout information of an image-based asset, application data, customer data, a list of instructions, a setting of an application, a version of an application, a version of an OS, display resolution configuration of a client, a product identifier of an application, an amount of storage used by an application, a language setting of an OS, a serial number of a client, a hardware identification (ID) number of a hardware component, an identifier of a client's manufacturer, a product identifier of a hardware component, media access control (MAC) information of a client, network connectivity information (e.g., a category of a network) of a client, an identifier of a client, a type of a client, a type of a file system, one or more outputs of the processes performed by the analyzer (122), etc.

In one or more embodiments, the unstructured and/or structured data may be updated (automatically) by third party systems (e.g., platforms, marketplaces, etc.) (provided by vendors) or by administrators based on, for example, newer (e.g., updated) versions of SLAs being available. The unstructured and/or structured data may also be updated when, for example (but not limited to): a purchase order is received, a set of jobs is received, an ongoing purchase order is fully completed, etc.

In one or more embodiments, similar to the communication between the clients (e.g., Client A (110A), Client B (110B), Client N (110N), etc.) and the production host, the clients (e.g., Client A (110A), Client B (110B), Client N (110N), etc.) may also send a request to the database (126), and in return, the clients (e.g., Client A (110A), Client B (110B), Client N (110N), etc.) may receive a response (e.g., a documentation that indicates a status of a recently initiated purchase order) from an agent (not shown) of the database (126). One of ordinary skill will appreciate that the database (126) may perform other functionalities without departing from the scope of the embodiments disclosed herein.

In one or more embodiments, the database (126) may provide an indexing service. For example, the agent of the database (126) may receive various model training related inputs directly (or indirectly) from an administrator of the VE (120). Upon receiving, the agent may analyze those inputs to generate an index(es) (e.g., a training process index(es)) for optimizing the performance of the database (126) by reducing a required amount of database access(es) when implementing a request (e.g., a data retrieval request). In this manner, requested data may be quickly located and accessed from the database (126) using an index of the requested data. In one or more embodiments, an index may refer to a database structure that is defined by one or more field expressions. A field expression may be a single field name such as "user_number". For example, an index (e.g., E41295) may be associated with "user_name" (e.g., Adam Smith) and "user_number" (e.g., 012345), in which the requested data is "Adam Smith 012345".

In one or more embodiments, the unstructured and/or structured data may be maintained by, for example, the analyzer (122), the annotators (124), and an administrator of the VE (120). The analyzer (122), the annotators (124), and the administrator may add, remove, and/or modify those data in the database (126) to cause the information included in the database (126) to reflect the latest version of, for example, SLAs. The unstructured and/or structured data available in the database (126) may be implemented using, for example, lists, tables, unstructured data, structured data, etc. While described as being stored locally, the unstructured and/or structured data may be stored remotely, and may be distributed across any number of devices without departing from the scope of the embodiments disclosed herein.

While the database (126) has been illustrated and described as including a limited number and type of data, the database (126) may store additional, less, and/or different data without departing from the scope of the embodiments disclosed herein.

One of ordinary skill will appreciate that the database (126) may perform other functionalities without departing from the scope of the embodiments disclosed herein. The database (126) may be implemented using hardware, software, or any combination thereof.

In one or more embodiments, as being a physical computing device or a logical computing device, the production host may be configured for hosting and maintaining various workloads, and/or for providing a computing environment whereon workloads may be implemented. For example, the production host may exchange data with other components of the system (100) in order to, for example, participate in a collaborative workload placement. As yet another example, the production host may split up a request (e.g., an operation, a task, an activity, etc.) with another component, coordinating its efforts to complete the request (e.g., to generate a response) more efficiently than if the production host had been responsible for completing the request. One of ordinary skill will appreciate that the production host may perform other functionalities without departing from the scope of the embodiments disclosed herein.

In one or more embodiments, the production host may host any number of applications (and/or content accessible through the applications) that provide application services to the clients (e.g., Client A (110A), Client B (110B), Client N (110N), etc.). Application services may include, for example (but not limited to): database services, electronic communication services, instant messaging services, file storage services, web-based services, desktop-based services, workload placement collaboration services, serving (e.g., processing) a request, sharing an application log, receiving computing resource details of a node, transmitting a request, analyzing data, streaming video, etc. In order to provide application services, each application may host similar or different components. The components may be, for example (but not limited to): instances of databases, instances of email servers, etc.

Further, applications may vary in different embodiments, but in certain embodiments, applications may be custom developed or commercial (e.g., off-the-shelf) applications that a user desires to execute in the production host. In one or more embodiments, applications may be logical entities executed using computing resources of the production host. For example, applications may be implemented as computer instructions, e.g., computer code, stored on persistent storage of the production host that when executed by the processor(s) of the production host cause the production host to provide the functionality of the applications described throughout the application.

In one or more embodiments, while performing, for example, one or more operations requested by a user of the clients (e.g., Client A (110A), Client B (110B), Client N (110N), etc.), applications installed on the production host may include functionality to request and use resources (e.g., data, computing resources, etc.) of the production host. Applications may also perform other types of functionalities not listed above without departing from the scope of the embodiments disclosed herein. In one or more embodiments, while providing application services to a user, applications may store (temporarily or permanently) data that may be relevant to the user in the persistent storage.

In one or more embodiments, the production host may provide computer-implemented services to the clients (e.g., Client A (110A), Client B (110B), Client N (110N), etc.) (and/or other components of the system (100)). The production host may provide any quantity and any type of computer-implemented services (e.g., data storage services, electronic communication services, etc.). To provide computer-implemented services, the production host may include a collection of physical components (e.g., processing resources, storage/memory resources, networking resources, etc.) configured to perform operations of the production host and/or otherwise execute a collection of logical components (e.g., virtualization resources) of the production host. A portion of the collection of physical and logical components are described below.

In one or more embodiments, the production host may be capable of providing the aforementioned functionalities/services to users of the clients (e.g., Client A (110A), Client B (110B), Client N (110N), etc.). However, not all of the users may be allowed to receive all of the services. For example, the priority (e.g., the user access level) of a user may be used to determine how to manage computing resources within the production host to provide services to that user. As yet another example, the priority of a user may be used to identify the services that need to be provided to that user. As yet another example, the priority of a user may be used to determine how quickly communications (for the purposes of providing services in cooperation with the network (and its subcomponents)) are to be processed by the network.

Further, consider a scenario where a first user is to be treated as a normal user (e.g., a user with a user access level of 4/10). In such a scenario, the user level of that user may indicate that certain ports (of the production host) are to be opened, other ports are to be blocked so that (i) certain services are to be provided to the user by the production host and (ii) data traffic from that user is to be afforded a normal level of quality (e.g., a normal processing rate). In contrast, a second user may be determined to be a high priority user (e.g., a user with a user access level of 9/10). In such a case, the user level of that user may indicate that more ports are to be opened than were for the first user so that (i) the production host may provide more services to the second user and (ii) data traffic from that user is to be afforded a high level of quality (e.g., a higher processing rate than the traffic from the normal user).

In one or more embodiments, the production host may include any number of VMs that host the above-discussed applications. The VMs may be logical entities executed using the physical and logical components of the production host, or using computing resources of other computing devices connected to the production host. Each of the VMs may perform similar or different processes. In one or more embodiments, the VMs (and applications hosted by the VMs) may generate data (e.g., VM data) that is stored in the persistent storage of the production host, in which the VM data may reflect a state of a VM.

In one or more embodiments, VMs may provide services (e.g., application services) to the clients (e.g., Client A (110A), Client B (110B), Client N (110N), etc.). For example, VMs may host instances of databases, email servers, and/or other applications that are accessible to the clients (e.g., Client A (110A), Client B (110B), Client N (110N), etc.). The VMs may host other types of components not listed above without departing from the scope of the embodiments disclosed herein.

In one or more of embodiments, VMs may be implemented as computer instructions, e.g., computer code, stored in the persistent storage that when executed by the processor(s) of the production host cause the production host to provide the functionality of the VMs described throughout the application.

In one or more embodiments, the production host may include a hypervisor. The hypervisor may be configured to orchestrate the operation(s) of the VMs by allocating the physical and logical components to each of the VMs. In one or more embodiments, the hypervisor may be a physical device including circuitry, for example (but not limited to): a field-programmable gate array, an application-specific integrated circuit, a programmable processor, a microcontroller, a digital signal processor, etc. The physical device may be adapted to provide the functionality of the hypervisor described throughout the application. Alternatively, similar to the VMs, the hypervisor may also be implemented as computer instructions.

In one or more embodiments, the production host may be implemented as a computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the production host described throughout the application.

Alternatively, in one or more embodiments, similar to the analyzer (122), the production host may also be implemented as a logical device.

In one or more embodiments, the clients (e.g., Client A (110A), Client B (110B), Client N (110N), etc.) may be physical or logical computing devices configured for hosting one or more workloads, or for providing a computing environment whereon workloads may be implemented. The clients (e.g., Client A (110A), Client B (110B), Client N (110N), etc.) may correspond to computing devices that one or more users use to interact with one or more components of the system (100).

In one or more embodiments, a client may include any number of applications (and/or content accessible through the applications) that provide computer-implemented application services to a user. Applications may be designed and configured to perform one or more functions instantiated by a user of the clients (e.g., Client A (110A), Client B (110B), Client N (110N), etc.). Examples of an application may include (but not limited to): a word processor, a media player, a web browser, a file viewer, an image editor, etc.

In order to provide the above-mentioned application services, each application may host similar or different components. The components may be, for example (but not limited to): instances of databases, instances of email servers, etc. Applications may be executed on one or more clients as instances of the application.

In one or more embodiments, applications may vary in different embodiments, but in certain embodiments, applications may be custom developed or commercial applications that a user desires to execute in a client. In one or more embodiments, applications may be logical entities executed using computing resources of a client. For example, applications may be implemented as computer instructions, e.g., computer code, stored on persistent storage of the client that when executed by the processor(s) of the client cause the client to provide the functionality of the applications described throughout the application.

In one or more embodiments, while performing, for example, one or more operations requested by a user, applications installed on a client may include functionality to request and use physical and logical components of the client. Applications may also include functionality to use data stored in storage/memory resources of the client. The applications may perform other types of functionalities not listed above without departing from the scope of the embodiments disclosed herein. In one or more embodiments, while providing application services to a user, applications may store data that may be relevant to the user in storage/memory resources of a client.

In one or more embodiments, the clients (e.g., Client A (110A), Client B (110B), Client N (110N), etc.) may interact with the production host. For example, the clients (e.g., Client A (110A), Client B (110B), Client N (110N), etc.) may issue requests to the production host to receive responses and interact with various components of the production host. The clients (e.g., Client A (110A), Client B (110B), Client N (110N), etc.) may also request data from and/or send data to the production host. As yet another example, the clients (e.g., Client A (110A), Client B (110B), Client N (110N), etc.) may utilize application services provided by the production host. When the clients (e.g., Client A (110A), Client B (110B), Client N (110N), etc.) interact with the production host, data that is relevant to the clients (e.g., Client A (110A), Client B (110B), Client N (110N), etc.) may be stored (temporarily or permanently) in the production host.

As yet another example, consider a scenario in which the production host hosts a database utilized by the clients (e.g., Client A (110A), Client B (110B), Client N (110N), etc.). In this scenario, the database may be a client database associated with users of the clients (e.g., Client A (110A), Client B (110B), Client N (110N), etc.). When a new user is identified, the clients (e.g., Client A (110A), Client B (110B), Client N (110N), etc.) may add information of the new user to the client database. By doing so, data that is relevant to the clients (e.g., Client A (110A), Client B (110B), Client N (110N), etc.) may be stored in the production host. This may be done because the clients (e.g., Client A (110A), Client B (110B), Client N (110N), etc.) may desire access to the information of the new user at some point-in-time.

As yet another example, a client may execute an application that interacts with an application database hosted by the production host. When an application upgrade is available to fix a critical software issue, the production host may identify the client that requires the application upgrade. The application database may then provide the application upgrade to the client. By doing so, the application executed by the client may be kept up-to-date. As yet another example, the clients (e.g., Client A (110A), Client B (110B), Client N (110N), etc.) may send instructions to the production host to configure one or more VMs hosted by the production host. In one or more embodiments, instructions may be, for example (but not limited to): instructions to configure a backup policy, instructions to take a snapshot of VM data, etc.

As yet another example, a client may initiate an application to execute on the production host such that the application may (itself) gather, transmit, and/or otherwise manipulate data located in the production host, remote to the client. In one or more embodiments, the clients (e.g., Client A (110A), Client B (110B), Client N (110N), etc.) may share access to more than one production host and may similarly share any data located in those hosts.

In one or more embodiments, the clients (e.g., Client A (110A), Client B (110B), Client N (110N), etc.) may provide computer-implemented services to users (and/or other computing devices such as, for example, other clients or other types of components). The clients (e.g., Client A (110A), Client B (110B), Client N (110N), etc.) may provide any quantity and any type of computer-implemented services (e.g., data storage services, electronic communication services, etc.). To provide computer-implemented services, each client may include a collection of physical components (described below) configured to perform operations of the client and/or otherwise execute a collection of logical components (described below) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a CPU, a graphical processing unit (GPU), a data processing unit (DPU), a computation acceleration resource, application specific integrated circuits (ASICs), a digital signal processor for facilitating high speed communication, etc.

In one or more embodiments, a storage or memory resource (not shown) may refer to a measurable quantity of a storage/memory-relevant resource type, which can be requested, allocated, and consumed. A storage/memory-relevant resource type may encompass a physical device, a logical intelligence, or a combination thereof, which may provide temporary or permanent data storage functionality and/or services. Examples of a storage/memory-relevant resource type may be (but not limited to): an HDD, an SSD, RAM, Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, a client may include a memory management unit (MMU) (not shown), in which the MMU is configured to translate virtual addresses (e.g., those of a virtual address space (discussed below)) into physical addresses (e.g., those of memory). In one or more embodiments, the MMU may be operatively connected to the storage/memory resources, and the MMU may be the sole path to access the memory, as all data destined for the memory must first traverse the MMU prior to accessing the memory. Further, the MMU may be configured to: (i) provide memory protection (e.g., allowing only certain applications to access memory) and (ii) provide cache control and bus arbitration.

In one or more embodiments, while the clients (e.g., Client A (110A), Client B (110B), Client N (110N), etc.) provide computer-implemented services to users, the clients (e.g., Client A (110A), Client B (110B), Client N (110N), etc.) may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (e.g., Client A (110A), Client B (110B), Client N (110N), etc.) may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the embodiments disclosed herein.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card, a network adapter, a network processor, etc.

In one or more embodiments, a networking resource may provide capabilities to interface a client with external entities (e.g., other clients, the VE (120), etc.) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transmission control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other clients. For example, when utilizing remote direct memory access (RDMA) to access data on another client, it may not be necessary to interact with the logical components of that client. Rather, when using RDMA, it may be possible for the networking resource to interact with the physical components of that client to retrieve and/or transmit data, thereby avoiding any higher-level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU, a virtual storage pool, etc.

In one or more embodiments, a virtualization resource may include a hypervisor, in which the hypervisor may be configured to orchestrate an operation of, for example, a VM by allocating computing resources of a client to the VM. Details of the hypervisor are described above.

In one or more embodiments, each client may include any logic, business rule, function, and/or operation for optimizing, accelerating, or otherwise improving the performance, operation, and/or quality of service of outgoing network traffic or the delivery of data packets over the network (130). In this manner, each client may (a) regulate (or manage) data transfer rates (e.g., data transfer via a high priority network slide that implements a high communication bandwidth network capacity, data transfer via a low priority network slice that implements a low communication bandwidth network capacity, etc.) and data receipt rates in conjunction with a network device (not shown), (b) coordinate with the network device to manipulate, adjust, simulate, change, improve, or otherwise adapt the behavior of a predetermined data transfer protocol to improve performance of delivery, data rates, and/or communication bandwidth utilization of the network (130), (c) implement (in conjunction with the network device) a data transfer/flow control method, for example (but not limited to): a pre-acknowledgement method, a window virtualization method, a re-congestion method, a local re-transmission method, a transaction boundary detection method, a re-packetization method, etc., and (d) measure and monitor the performance of any acceleration technique performed by the network device, such as SSL offloading, load balancing and/or content switching, connection pooling and multiplexing, caching, and compression.

In one or more embodiments, the clients (e.g., Client A (110A), Client B (110B), Client N (110N), etc.) may be implemented as computing devices (e.g., 600, FIG. 6). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the clients (e.g., Client A (110A), Client B (110B), Client N (110N), etc.) described throughout the application.

Alternatively, in one or more embodiments, similar to the analyzer (122), the clients (e.g., Client A (110A), Client B (110B), Client N (110N), etc.) may also be implemented as logical devices.

In one or more embodiments, users may interact with (or operate) the clients (e.g., Client A (110A), Client B (110B), Client N (110N), etc.) in order to perform work-related tasks (e.g., production workloads). In one or more embodiments, the accessibility of users to the clients (e.g., Client A (110A), Client B (110B), Client N (110N), etc.) may depend on a regulation set by an administrator of the clients (e.g., Client A (110A), Client B (110B), Client N (110N), etc.). To this end, each user may have a personalized user account that may, for example, grant access to certain data, applications, and computing resources of the clients (e.g., Client A (110A), Client B (110B), Client N (110N), etc.). This may be realized by implementing the "virtualization" technology (discussed above).

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a GUI generated by a visualization module (not shown) of the client. In one or more embodiments, the visualization module may be implemented in hardware (e.g., circuitry), software, or any combination thereof.

In one or more embodiments, a GUI may be displayed on a display of a computing device (e.g., 600, FIG. 6) using functionalities of a display engine (not shown), in which the display engine is operatively connected to the computing device. The display engine may be implemented using hardware, software, or any combination thereof. The login screen may be displayed in any visual format that would allow the corresponding user to easily comprehend (e.g., read and parse) the listed information.

In one or more embodiments, the network (130) may represent a computing network configured for computing resource and/or messages exchange among registered computing devices (e.g., the clients (e.g., Client A (110A), Client B (110B), Client N (110N), etc.), the analyzer (122), etc.). As discussed above, components of the system (100) may operatively connect to one another through the network (e.g., a LAN, a WAN, a mobile network, a wireless LAN (WLAN), etc.). In one or more embodiments, the network (130) may be implemented using any combination of wired and/or wireless network topologies, and the network (130) may be operably connected to the Internet or other networks. Further, the network (130) may enable interactions between, for example, the analyzer (122) and the clients (e.g., Client A (110A), Client B (110B), Client N (110N), etc.) through any number and type of wired and/or wireless network protocols (e.g., TCP, UDP, Internet Protocol version 4 (IPv4), etc.). Further, the network (130) may be configured to perform all, or a portion, of the functionality described in FIGS. 3.1-3.3.

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components (e.g., a network device) in the network, and (iii) limiting communication(s) on a granular level (e.g., on a per-port level, on a per-sending device level, etc.).

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly. In one or more embodiments, the network-enabled subcomponents may decide how real-time (e.g., on the order of milliseconds or less) network traffic and non-real-time network traffic should be managed in the network (130). In one or more embodiments, the real-time network traffic may be high priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VoIP), etc.

In one or more embodiments, the non-real-time network traffic may be low priority (e.g., non-urgent) network traffic. For this reason, data packets of the non-real-time network traffic may not need to be prioritized in the network (130). The non-real-time network traffic may include data packets related to, for example (but not limited to): File Transfer Protocol (FTP) for web publishing, email applications, etc.

Figure 2:
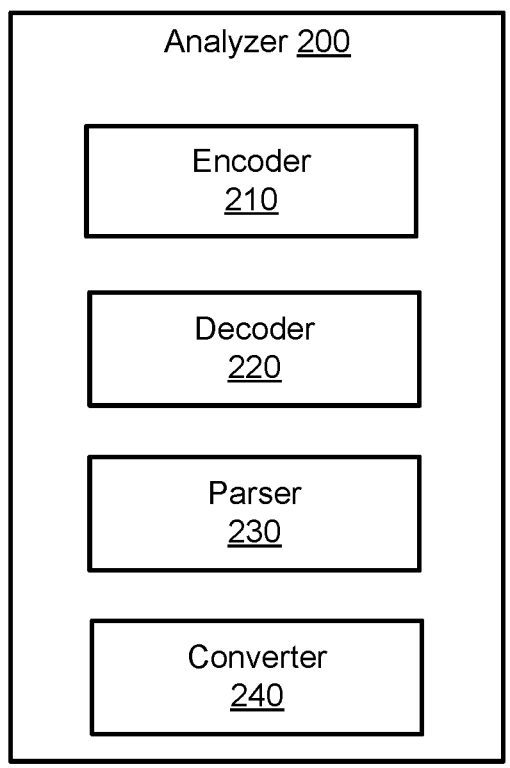
FIG. 2 shows a diagram of an analyzer in accordance with one or more embodiments disclosed herein.

Turning now to FIG. 2, FIG. 2 shows a diagram of an analyzer (200) in accordance with one or more embodiments disclosed herein. The analyzer (200) may be an example of the analyzer discussed above in reference to FIG. 1. The analyzer (200) may include an encoder (210), a decoder (220), a parser (230), and a converter (240). The analyzer (200) may include additional, fewer, and/or different components without departing from the scope of the embodiments disclosed herein. Each component may be operably connected to any of the other component via any combination of wired and/or wireless connections. Each component illustrated in FIG. 2 is discussed below.

In one or more embodiments, the encoder (210) may include functionality to, e.g.: (i) obtain (or receive) an image-based asset (e.g., a scan of a purchase order, an image of a PDF document, an image of a multilingual Word document, etc.) from an entity (e.g., a customer) as input, (ii) based on (i), generate image patches (e.g., fixed-sized image patches) from the image-based asset (by splitting the image into image patches), (iii) generate an input embedding for each image patch, in which an input embedding is a low-dimensional vector representation of an image patch, (iv) generate an output embedding based on an input embedding (where the encoder (210) may process each image patch (through one or more convolutional neural network (CNN) layers (described below)) to encode key features of the asset, in which the output embedding is a high-dimensional vector representation of an image patch (associated with the input embedding) that specifies a presence of a key feature (described above in reference to FIG. 1) contained in the image patch (in which a "presence of a feature" indicates that there is some text (e.g., some information) that needs to be considered by the decoder (220)), (v) based on (iv), send the output embedding to the decoder (220) or a downstream system for storage or further processing (e.g., by one or more other neural networks), and (vi) store the above-discussed data and/or the output(s) of the above-discussed processes in the database (e.g., 126, FIG. 1). Additional details of the encoder are described below in reference to FIG. 3.2.

As used herein, an "embedding" is an ordered collection of numeric values that represents an input in a particular embedding space. For example, an embedding may be a vector of floating point or other numeric values that has a fixed dimensionality.

In one or more embodiments, the encoder (210) (or the "transformer-based visual encoder") may include an image patch generation module (not shown) that segments (or splits) an image into multiple image patches (in which the image may first be obtained (or received) by the image patch generation module as input). The image patches (or a CNN input generated from the image patches) may then be processed by CNN layers of the encoder (210) and the decoder (220) to generate a prediction about the image (e.g., based on the output embeddings generated by the encoder (210)).

In one or more embodiments, the image patch generation module may generate image patches that each have the same size and shape, e.g., each image patch may be a rectangle. For example, the image patch generation module may split an image such that every pixel is a member of exactly one image patch, in which the resulting image patches may represent (i) a grid of same-sized (e.g., fixed-size) rectangles or (ii) may represent a grid of same-sized hexagons.

In one or more embodiments, the image patch generation module may generate image patches that each have different sizes. The image patch generation module may also split an image such that some pixels are members of multiple different image patches. Further, the image patch generation module may also split an image such that some pixels are not members of any image patch. For example, the image generation module may process that image using an ML/AI model to identify one or more regions of interest, and the image patch generation module may generate a respective patch for each identified region of interest (where the model may be configured to identify one or more pixels, and the image patch generation module may generate a respective patch centered at each identified pixel).

In one or more embodiments, the image patch generation module may generate image patches of arbitrary shape, in which the image patches are not required to be rectangular. For example, the image patch generation module may process an image using an ML/AI model that is configured to split the image by assigning each pixel in the image to a respective class. The image patch generation module may then generate a respective patch for each adjacent set of pixels that have been assigned to the same class by the model.

In one or more embodiments, the image patch generation module may generate a one-dimensional space-filling curve that includes each pixel of an image. The image patch generation module may then split the one-dimensional space-filling curve to generate a set of one-dimensional image patches. For example, the image patch generation module may split each column or row of the image into sub-sequences of the pixels of the column or row, such that each sub-sequence represents an image patch.

In the aforementioned examples, the images may be illustrated as two-dimensional images (or images that are two-dimensional with multiple channels, e.g., red, green, blue (RGB) images); however, the analyzer (200) may be configured to generate predictions for any type of image.

Further, to handle an image (e.g., a two-dimensional image), the image patch generation module may reshape the image ($x \in \mathbb{R}^{H \times W \times C}$) into a sequence of flattened two-dimensional image patches ($x_p \in \mathbb{R}^{N \times (P^2 \times C)}$), in which (H, W) is the resolution of the image, C is the number of channels (e.g., C=3 for an RGB image), (P, P) is the resolution of each image patch, and ($N=HW/P^2$) is the resulting number of image patches (which also serves as the effective input sequence length for the Fourier transform neural network layers). The encoder (210) may use constant latent vector size D through all of its neural network layers. For this reason, an image patch embedding module (not shown) of the encoder (210) may flatten the image patches and map to D dimensions with a trainable linear projection (where the output of this projection may be referred as "input embeddings"). For example, the image patch embedding module may "flatten" each image patch to generate an input embedding that is a one-dimensional tensor that includes each pixel in the image patch.

As described above, the image patch embedding module may map (or convert) a given image ($x \in \mathbb{R}^{H \times W \times C}$) into one or more input embeddings ($\{z_i | z_i \in \mathbb{R}^D, 1 \le i \le N\}$). More specifically, the image patch embedding module may process each image patch using a linear projection ($z_i = x_i E_i + b_i$), in which ($z_i \in \mathbb{R}^D$) is the $i^{th}$ image patch embedding (or the input embedding), D is the input dimensionality required by the neural network layers, ($x_i \in \mathbb{R}^A$) is the one-dimensional tensor including the $i^{th}$ image patch, A is the number of pixels in the $i^{th}$ image patch, ($E_i \in R^{A \times D}$) is a projection matrix, and ($b_i \in \mathbb{R}^D$) is a linear bias term. Said another way, the image patches may be processed by the image patch embedding module, which has been configured through training to accept inputs having a particular format, e.g., a particular size and shape. Thus, the image patch embedding module may project each image patch into a coordinate space that has the dimensionality required by the neural network layers of the encoder (210) (e.g., the Fourier transform neural network layers that do not require any learnable parameters unlike an attention mechanism of a conventional transformer).

As described above, each image patch is linearly embedded (via the linear projection) without any additional learnable one-dimensional position embeddings as the linear transformation mechanism itself captures the positions. In this manner, there is no need to employ additional positon embeddings comparing to a conventional transformer.

In one or more embodiments, the image patch embedding module may use a respective different projection matrix $E_i$ to generate each input embedding. Similarly, in one or more embodiments, the image patch embedding module may use a respective different bias term $b_i$ to generate each input embedding.

In one or more embodiments, the linear projection may be machine-learned. For example, during training of the encoder (210), the training system may concurrently update the parameters of the linear projection (e.g., the parameters of the projection matrices $E_i$ and bias terms $b_i$). As yet another example, the training system may update the parameters of the linear projection by backpropagating a training error of a neural network layer(s) of the encoder (210) through (i) the neural network layers and (ii) the image patch embedding module, and determining the update using stochastic gradient descent on the backpropagated error.

In one or more embodiments, instead of (or in addition to) processing the one-dimensional tensors corresponding to the image patches with a linear projection, the image patch embedding module may process the one-dimensional tensors using an embedding neural network. For example, the embedding neural network may include one or more feed-forward neural network layers that are configured to process the one-dimensional tensors and to generate the input embeddings. As yet another example, the embedding neural network may include one or more CNNs that are configured to process an image patch using a convolutional filter.

As yet another example, if the image patches are represented as two-dimensional images, the image patch embedding module may process each (unflattened) image patch using one or more CNN layers to generate a feature map of the image patches. The image patch embedding module may then flatten the feature map and process the flattened feature map using the linear projection (as described above) to generate the corresponding input embeddings. As yet another example, the image patch embedding module may process an entire image using one or more CNN layers to generate a feature map of the image, in which the feature map may be two-dimensional. The image patch embedding module (in conjunction with the image patch generation module) may then determine image patches of the feature map, where each patch includes one or more elements of the feature map. That is, instead of splitting the image itself into the image patches, the image patch generation module may split the feature map of the image generated by the embedding neural network of the image patch embedding module.

After the image patch embedding module generates the input embeddings, the image patch embedding module may generate an input sequence (from the input embeddings) to be provided as input to the Fourier transform neural network layers (after normalizing via the normalization layer). In one or more embodiments, the input sequence may include one or more input elements corresponding to respective input embeddings. For example, the input sequence may include a respective input element corresponding to each of the input embeddings (that are generated from the image patches). As yet another example, the input elements corresponding to the input embeddings may be sorted (in the input sequence) in the raster order of the corresponding image patches.

In one or more embodiments, during the training of the image patch embedding module, the image patch embedding module may learn how to generate representations of input sequences that encode information about the corresponding input images that is useful for performing multiple different machine learning tasks. Much of the time and computational cost of training the image patch embedding module may be done "up-front" during the training of the image patch embedding module, in which the cost of training the image patch embedding module may be amortized over multiple task neural networks.

In one or more embodiments, after generating the input sequence, image patch embedding module may provide the input sequence as input to the Fourier transform neural network layers (after normalizing). The Fourier transform neural network layers may then process the input sequence (i) to extract relationships among features and (ii) to generate an output sequence (e.g., the output embeddings). In one or more embodiments, the Fourier transform neural network layers may generate an output sequence of the same length as the input sequence, i.e., that includes a respective output element for each input element in the input sequence.

In one or more embodiments, because the encoder (210) employs the "simple non-parametrized linear-transform"

approach, the encoder (210) may include (or may use a combination of) CNN layers, e.g., one or more Fourier transform neural network layers (described below), one or more normalization layers (described below), and one or more residual connection layers (described below), to process an input image and extract key features. In this manner, issues (e.g., time-inefficient processing, increased processing complexity when the number of image patches are increased, etc.) related to attention mechanism of conventional transformers may not be experienced (or eliminated).

In one or more embodiments, as being a perceptron block, a Fourier transform neural network layer may be configured to receive as input a sequence of layer input elements representing respective patches of an image (e.g., normalized input embeddings) and to apply a Fourier transform mechanism over the normalized input embeddings to generate a sequence of layer output elements (e.g., output embeddings that contain key features or specify presence of those features). In particular, for each layer input element, the Fourier transform neural network layer may implement the Fourier transform mechanism over a layer input elements using one or more queries derived from the layer input element to generate a corresponding output element.

In one or more embodiments, one or more residual connections (or residual connection layers) may be made after each Fourier transform neural network layer (in which a residual connection combines the outputs of a Fourier transform neural network layer with the inputs (e.g., the input embeddings) of that layer). A residual connection may be used to ensure that each Fourier transform neural network layer learns to identify and preserve one or more key features of an input image (for example, even activations of each Fourier transform neural network layer may be transformed through multiple layers of processing). Further, a residual connection: (i) may reduce the risk of each Fourier transform neural network layer losing key features (or key information) as it processes an input image, (ii) may improve performance of each Fourier transform neural network layer and make it easier to train, and (iii) may allow activations to be passed from one layer to another layer to prevent the "vanishing gradient problem" (so that each layer may learn effectively during training because the residual connection(s) make sure that the gradient are not too small), in which the vanishing gradient problem occurs when the gradients become too small and the corresponding network could not learn effectively.

In one or more embodiments, the encoder (210) may use multiple perceptron blocks (e.g., a set of layers) to encode an input image, which means the encoder (210) may include multiple Fourier transform neural network layers. Each perceptron block in the encoder (210) may include multiple layers of artificial neurons that are connected and trained to perform one or more specific tasks (e.g., complex image processing tasks, such as object detection, segmentation, and classification). The input to each perceptron block may be processed through these layers of neurons, which perform mathematical operations to extract key features from the input (e.g., an input embedding). The output from each perceptron may then be passed on to the next layer in the encoder (210), which is a normalization layer (described below). In one or more embodiments, the combination of multiple perceptron blocks may allow the encoder (210) to learn complex relationships between the key features of an input image and to generate a high-dimensional vector representation of the image (that summarizes its key features) by processing the input image through multiple layers of artificial neurons and combining the outputs from these layers.

In one or more embodiments, a normalization (neural network) layer (not shown) may be applied (i) before each Fourier transform neural network layer (e.g., may be applied to each input embedding before processing) and (ii) after each Fourier transform neural network layer (e.g., may be applied to each output obtain from the Fourier transform neural network layers) to generate the output embeddings. In one or more embodiments, a normalization layer may normalize activations of each Fourier transform neural network layer, in which the activations are rescaled to have zero mean and unit variance. In this manner, one or more internal covariate shifts (e.g., one or more changes in the distribution of activations between layers) may be minimized (i) to obtain full performance from each Fourier transform neural network layer, (ii) to improve stability and consistency of the activations, and (iii) to prevent any exploding or vanishing gradient problem (which may occur during the training process), in which the exploding gradient problem occurs when the gradients become too large and causes the corresponding network to blow up.

In one or more embodiments, each Fourier transform neural network layer may automatically learn how each input embedding (e.g., each image patch) is related to other image patches of an image (e.g., the relationship between each image patch), where information just flows by combining each patch in the frequency domain instead of learning how the information flows. To make this possible, for example, each Fourier transform neural network layer may implement one Fourier transform operation in the latent domain and one in the time domain. By employing fast Fourier transform equations (depending on the number of image patches), each Fourier transform neural network layer may learn an input embedding via summation of all other tokens which are represented in terms of sine and cosine. Output of each Fourier transform neural network layer may represent the frequency of image patches out of all the image patches, in which the encoder (210) includes a feed-forward neural network layer for each frequency.

In one or more embodiments, some or all of the Fourier transform neural network layers may be multi-head Fourier transform neural network layers. A multi-head Fourier transform neural network layer may apply multiple Fourier transform mechanisms in parallel to generate respective sequences of layer output elements, and then combines the multiple sequences of layer output elements to generate a final sequence of layer output elements (e.g., the output embeddings that are not yet normalized). The output elements may then be normalized (via a normalization layer) and processed (via a feed-forward neural network layer) to generate encoder output (e.g., the output embeddings), which will be feed into the decoder (220).

Continuing with the above discussion, the encoder (210) may include one or more (e.g., a sequence of) Fourier transform neural network layers (or blocks). Each network block may be configured to receive a respective block input sequence that includes a respective block input element for each input position in an input sequence (that includes the input embeddings); that is, each block input element corresponds to a respective input element of the input sequence. Each network block may be configured to process the block input sequence and to generate a block output sequence that includes a respective block output element for each of the multiple input positions in the input sequence; that is, each block input sequence preserves the number of elements in the input sequence as the input sequence is processed by the Fourier transform neural network layers.

In one or more embodiments, a first network block in the sequence may receive the input sequence. Each subsequent network block in the sequence may receive (as the block input sequence) the respective block output sequence generated by the preceding network block in the sequence. The block output sequence of the final network block in the sequence may be the output of the sequence, which may be the input of a normalization layer (described above).

As discussed above in reference to FIG. 1, the encoder (210) and the decoder (220) may be trained concurrently end-to-end on one or more ML/AI tasks. For example, the training system may execute a supervised training process using a training dataset that includes multiple training examples that each include a training input sequence (representing respective training images) and a corresponding ground-truth, i.e., a formatted asset (provided by the parser (230)) that represents the output asset (e.g., the network output) that the converter (240) should generate in response to processing the training input sequence.

In one or more embodiments, the training system may process the training input sequence using the encoder (210) and the decoder (220) (a) to generate respective predicted network outputs, and (b) to determine a "parameter update" for the decoder (220) according to an error between (i) the predicted network output and (ii) the corresponding ground-truth. For example, the training system may determine the parameter update by backpropagating the error through the decoder (220) and performing stochastic gradient descent. As yet another example, the training system may train the decoder (220) using one or more other encoders that are different from the encoder (210), e.g., that are configured to perform different ML/AI tasks than the encoder (210).

One of ordinary skill will appreciate that the encoder (210) may perform other functionalities without departing from the scope of the embodiments disclosed herein. When providing its functionalities, the encoder (210) may perform all, or a portion, of the methods illustrated in FIG. 3.1. The encoder (210) may be implemented using hardware, software, or any combination thereof.

In one or more embodiments, the decoder (220) may include functionality to, e.g.: (i) obtain (or receive) output embeddings from the encoder (210), (ii) obtain (or receive) a formatted asset from the parser (230), (iii) based on (i) and (ii), infer details of an image-based asset based on the output embeddings and formatted asset (in which the details specifies one or more features (described above)), (iv) based on (iii), generate a decoder output based on the inferred details, (v) based on (iv), send the decoder output to the converter (240), and (vi) store the above-discussed data and/or the output(s) of the above-discussed processes in the database (e.g., 126, FIG. 1). Additional details of the decoder are described below in reference to FIG. 3.3.

In one or more embodiments, with the encoded embeddings (e.g., the output embeddings, which is a high-dimensional representation or a feature map) received from the encoder (210), the decoder (220) (or the "transformer-based sequence-sequence textual decoder") may perform a specific computer vision task (e.g., relevant information extraction such as the date, the total amount, the vendor name, etc.) using the output embeddings (e.g., the decoder (220) may use the feature map to recognize the text on the input image). More specifically, the decoder (220) may generate a sequence of tokens (e.g., a token sequence $\{(y_t)_{i=1}^{m}\}$, in which $\{y_t \in \mathbb{R}^v\}$ is an one-hot vector for the it token, v is the size of a token vocabulary (e.g., all the tokens in training data), and m is a hyperparameter (which may be tuned for a better performance)) that may be converted (by the converter (240)) into target type information in a structured format (e.g., an output asset (which is in a simplified, human-readable format), see FIGS. 5.1 and 5.3).

In one or more embodiments, the decoder (220) may be trained to generate a token sequence (e.g., a decoder output) that may be converted into (by the converter (240)), for example, a JSON document (because of its high representation capacity) that represents the desired structured output information (associated with a given image to the encoder (210)). In one or more embodiments, the token sequence may include (to help the converter (240) to understand the structure (e.g., where the "shipping address" starts and ends in the token sequence) of the decoder output provided by the decoder (220) to generate a coherent output asset) at least a start token (e.g., [START *]) and an end token (e.g., [END *]), in which (i) the start token marks a beginning of a feature in the token sequence, (ii) the end token marks an end of the feature in the token sequence, and (iii) "*" indicates each field to extract (to generate the output asset).

In one or more embodiments, as being a trained component on "how to understand the context of output embeddings" and while generating the decoder output, the decoder (220) may process the output embeddings (e.g., output of the encoder (210)) to (i) infer complex structures (i.e., nested groups and hierarchies such as items→item→{name, count, price}) of features (extracted from an input image) and (ii) predict relationships among the features (e.g., {name, count, price} of a product) using, for example, one or more feed-forward neural network layers. Further, the decoder (220) may be configured to perform any appropriate ML/AI task with respect to the input, e.g., a classification task, a regression task, or a combination thereof.

As used herein, a "token sequence" is a sequence of symbols or tokens that represent the processed text. Tokens are the basic units of representation in natural language processing (NLP) tasks (such as text generation), in which the decoder (220) takes the high-dimensional representation of the input image generated by the encoder (210) and converts it into a sequence of tokens that represents the processed text. As described above, the token sequence may be generated by applying a combination of recurrent neural networks (RNNs) to the feature map produced by the encoder (210).

One of ordinary skill will appreciate that the decoder (220) may perform other functionalities without departing from the scope of the embodiments disclosed herein. When providing its functionalities, the decoder (220) may perform all, or a portion, of the methods illustrated in FIG. 3.3. The decoder (220) may be implemented using hardware, software, or any combination thereof.

In one or more embodiments, the parser (230) may include functionality to, e.g.: (i) obtain (or receive) an annotated asset (see FIG. 4.1) from an annotator of the annotators (e.g., 124, FIG. 1), (ii) based on (i), convert the annotated asset into a formatted asset (see FIG. 4.2) by employing a set of linear, non-linear, and/or ML/AI models (e.g., a parsing script), (iii) based on (ii), send the formatted asset to the decoder (220), and (iv) store the above-discussed data and/or the output(s) of the above-discussed processes in the database (e.g., 126, FIG. 1).

One of ordinary skill will appreciate that the parser (230) may perform other functionalities without departing from the scope of the embodiments disclosed herein. When providing its functionalities, the parser (230) may perform all, or a portion, of the methods illustrated in FIG. 3.1. The parser (230) may be implemented using hardware, software, or any combination thereof.

In one or more embodiments, the converter (240) may include functionality to, e.g.: (i) obtain (or receive) a decoder output from the decoder (220), (ii) based on (i), convert the decoder output into an output asset (see FIG. 5.3), (iii) based on (ii), send the output asset to an administrator of the VE (e.g., 120, FIG. 1) using the GUI of the VE (e.g., 120, FIG. 1), and (iv) store the above-discussed data and/or the output(s) of the above-discussed processes in the database (e.g., 126, FIG. 1). Additional details of the converter are described below in reference to FIG. 3.3.

In one or more embodiments, the decoder output may be converted into the output asset (including, for example, an identifier of the image-based asset, an identifier of a vendor, an identifier of a customer, a purchase order number, etc.) using an output conversion script (e.g., a regular expression model or any other linear, non-linear, and/or ML/AI model).

In one or more embodiments, if the decoder output (e.g., the token sequence) is wrongly structured (e.g., if only [START customer_name] exists but no [END customer_name] exists), the converter (240) may treat the corresponding field as lost (in which the converter (240) could not extract the "customer_name" field).

As used herein, a "regular expression" model is a powerful pattern-matching tool used in text processing, in which the model provides a concise and flexible way of defining patterns in text. The model may be used to extract, modify, and match text data. With respect to the converter (240), the converter (240) may use the regular expression model to process and manipulate a token sequence generated by the decoder (220). For example, the model may be used to identify specific patterns in the token sequence, such as dates, numbers, or names, and to extract the relevant information.

One of ordinary skill will appreciate that the converter (240) may perform other functionalities without departing from the scope of the embodiments disclosed herein. When providing its functionalities, the converter (240) may perform all, or a portion, of the methods illustrated in FIG. 3.3. The converter (240) may be implemented using hardware, software, or any combination thereof.

In one or more embodiments, the encoder (210), the decoder (220), the parser (230), and the converter (240) may be utilized in isolation and/or in combination to provide the above-discussed functionalities. These functionalities may be invoked using any communication model including, for example, message passing, state sharing, memory sharing, etc. By doing so, the analyzer (200) may address issues related to data security, integrity, and availability proactively.

FIGS. 3.1-3.3 show a method for OCR-free information extraction from image-based documents in accordance with one or more embodiments of disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 3.1, the method shown in FIG. 3.1 may be executed by, for example, the above-discussed parser (e.g., 230, FIG. 2) and an annotator of the annotators (e.g., 122, FIG. 1). Other components of the system (100) illustrated in FIG. 1 may also execute all or part of the method shown in FIG. 3.1 without departing from the scope of the embodiments disclosed herein.

In Step 300, the annotator receives (or obtains) an image-based asset (e.g., a scan of a purchase order, an image of a PDF document, an image of a multilingual Word document, etc.) from an entity (e.g., a customer) as input. In one or more embodiments, the image-based asset may include multiple pixels.

In Step 302, in response to receiving the image-based asset, the annotator analyzes the image-based asset to manually generate an annotated asset (that includes text annotations of the image) after opening the asset. To make the annotation process simpler and error-free (said another way, to reduce the complexity of the annotation process), while generating the annotated asset (see FIG. 4.1), the annotator may simply write a label and its value separated by a colon (e.g., "file_name: image_44.jpg", "purchase order number: ITM12345", "payment term: 15 days", etc.).

In Step 304, upon generating the annotated asset (in Step 302), the annotator sends the annotated asset to the parser (via an API call or via any other communication mechanism), in which the parser may process the annotated asset for the desired structured form of information.

In Step 306, in response to receiving the annotated asset (e.g., a text file that has a simple format) from the annotator, the parser converts the annotated asset into a formatted asset by employing a set of linear, non-linear, and/or ML/AI models (e.g., a parsing script). In one or more embodiments, while generating the formatted asset, the parser may append each annotation into a final JSON file that has a complex format.

In Step 308, upon converting the annotated asset into the formatted asset (in Step 306), the parser sends the formatted asset to the decoder (e.g., 220, FIG. 2) for model training purposes (via an API call or via any other communication mechanism). Details of the model training process are described above in reference to FIGS. 1 and 2.

In one or more embodiments, after the encoder (e.g., 210, FIG. 2) and the decoder have been trained, the annotator may be removed from the pipeline of the OCR-free information extraction architecture. Said another way, after the encoder and the decoder have been trained, an automated ML/AI model may be obtained for OCR-free information extraction.

In one or more embodiments, the method may end following Step 308.

Turning now to FIG. 3.2, the method shown in FIG. 3.2 may be executed by, for example, the above-discussed encoder. Other components of the system (100) illustrated in FIG. 1 may also execute all or part of the method shown in FIG. 3.2 without departing from the scope of the embodiments disclosed herein.

In Step 310, the encoder receives (or obtains) an image-based asset (e.g., a scan of a purchase order, an image of a PDF document, an image of a multilingual Word document, etc.) from an entity (e.g., a customer) as input. In one or more embodiments, the image-based asset may include multiple pixels.

In Step 312, in response to receiving the image-based asset (in Step 310), the encoder generates image patches (e.g., fixed-sized image patches) from the image-based asset (by splitting the image into image patches). In one or more embodiments, each image patch may include a different subset of the pixels of the asset. Details of the image patch generation process are described above in reference to FIG. 2.

In Step 314, the encoder generates an input embedding for each fixed-sized image patch. In one or more embodiments, the encoder may process each of the image patches to generate an input sequence. For each image patch, the encoder may generate a respective one-dimensional initial input element that includes the pixels of the image patch. For example, the initial input element may be a flattened version of the image patch. The encoder may then generate an input element (e.g., an input embedding, which is a low-dimensional vector representation of an image patch) corresponding to the image patch using the initial input element. Details of the input embedding generation process are described above in reference to FIG. 2.

In Step 316, based on the input embeddings (generated in Step 314), the encoder generates one or more output embeddings (e.g., a feature map). In one or more embodiments, to generate an output embedding, the encoder may process each image patch through one or more CNN layers to encode key features of the asset. Details of the output embedding generation process are described above in reference to FIG. 2.

In Step 318, upon generating the output embeddings (in Step 316), the encoder sends (via an API call or via any other communication mechanism) the output embedding to the decoder or a downstream system for storage or further processing (e.g., by one or more other neural networks).

Turning now to FIG. 3.3, the method shown in FIG. 3.3 may be executed by, for example, the above-discussed decoder and the converter (e.g., 240, FIG. 2). Other components of the system (100) illustrated in FIG. 1 may also execute all or part of the method shown in FIG. 3.3 without departing from the scope of the embodiments disclosed herein.

In Step 320, the decoder receives (or obtains) the output embeddings from the encoder.

In Step 322, the decoder receives (or obtains) the formatted asset from the parser.

In Step 324, based on the output embeddings (obtained in Step 320) and the formatted asset (obtained in Step 322), the decoder infers details (e.g., one or more features) of the image-based asset (received by the encoder in Step 310 of FIG. 3.2). Details of the features are described above in reference to FIG. 2.

In Step 326, based on the inferred details (in Step 324), the decoder generates a decoder output (see FIG. 5.2) that characterizes the image-based asset. Details of the decoder output generation process are described above in reference to FIG. 2.

In Step 328, upon generating the decoder output, the decoder sends the decoder output to the converter (via an API call or via any other communication mechanism).

In Step 330, in response to receiving the decoder output, the converter converts the decoder output into an output asset (see FIG. 5.3). Details of the conversion process are described above in reference to FIG. 2.

In Step 332, upon converting the decoder output into the output asset (in Step 330), the converter sends the output asset to an administrator of the VE (e.g., 120, FIG. 1) using the GUI of the VE. The converter may then store (temporarily or permanently) the output asset in the database (e.g., 126, FIG. 1).

In one or more embodiments, the method may end following Step 332.

To further clarify embodiments disclosed herein, a non-limiting example annotated asset is provided in FIG. 4.1.

Start of Example

The example annotated asset, illustrated in FIG. 4.1, is not intended to limit the scope of the embodiments disclosed herein and is independent from any other examples discussed in this application.

Turning to the example, consider a use case in which an annotator (not shown) receives an image-based asset ("Asset A"). Assume here that Asset A includes multiple types of fields, such as single fields, composite fields, and tabular line items, in which (i) the "single fields" includes, at least, a purchase order (PO) number, a file name, and a date, (ii) the "composite fields" includes, at least, a shipping address, a billing address, a customer name, and a payment term, and (iii) the "tabular line items" includes, at least, a description, quantity, and unit price. In response to receiving Asset A, the annotator analyzes Asset A and generates the example annotated asset. For the sake of brevity, not all components of the example annotated asset may be illustrated in FIG. 4.1.

End of Example

To further clarify embodiments disclosed herein, a non-limiting example annotated asset and a non-limiting example formatted asset are provided in FIG. 4.2.

Start of Example

The example annotated asset and the example formatted asset, illustrated in FIG. 4.2, are not intended to limit the scope of the embodiments disclosed herein and are independent from any other examples discussed in this application.

Turning to the examples, consider a use case in which (upon generating the example annotated asset (discussed above in reference to FIG. 4.1)), the annotator (not shown) sends the example annotated asset to the parser (not shown). In response to receiving the example annotated asset, by employing a set of linear, non-linear, and/or ML/AI models (e.g., a parsing script), the parser converts the example annotated asset (a text file that includes at least a feature and information associated with that feature) into the example formatted asset (a JSON file). For the sake of brevity, not all components of the example formatted asset may be illustrated in FIG. 4.2.

End of Example

To further clarify embodiments disclosed herein, a non-limiting example use case is provided in FIGS. 5.1-5.3.

Start of Example

The example use case, illustrated in FIGS. 5.1-5.3, is not intended to limit the scope of the embodiments disclosed herein and is independent from any other examples discussed in this application.

Turning to the example, referring to FIG. 5.1, consider a use case (which indicates the pipeline of the OCR-free information extraction architecture) in which the encoder (500) receives Asset A (discussed above in reference to FIG. 4.1)). In response to receiving Asset A, the encoder (500) generates fixed-sized image patches from Asset A. For each fixed-sized image patch, the encoder (500) then generates an input embedding (in a matrix form indicating the content of Asset A). Thereafter, by processing the input embeddings through one or more neural network layers, the encoder (500) generates one or more output embeddings (a feature map in a matrix form). In response to receiving the output embeddings from the encoder (500) and the formatted asset from the parser (not shown), the decoder (502) then infers one or more features of Asset A. Based on the inferred features, the decoder (502) then generates a decoder output (which is being internal to the architecture and not being displayed to an administrator of the VE (not shown)) and sends the decoder output to the converter (504). In response to receiving the decoder output, the converter (504) converts the decoder output into an output asset. Upon converting the decoder output into the output asset, the converter (504) sends the output asset to the administrator using the GUI of the VE. The converter (504) then stores (temporarily or permanently) the output asset in the database (not shown).

Referring to FIG. 5.2, as discussed above, in response to receiving the output embeddings from the encoder (not shown) and the formatted asset (discussed above in reference to FIG. 4.2) from the parser (not shown), the decoder (502) infers one or more features of Asset A and, based on the inferred features, the decoder (502) generates the decoder output.

Referring to FIG. 5.3, as discussed above, in response to receiving the decoder output (which is one-to-one invertible to JSON data), the converter (504) converts the decoder output into the output asset (a JSON file).

End of Example

Turning now to FIG. 6, FIG. 6 shows a diagram of a computing device (600) in accordance with one or more embodiments disclosed herein.

In one or more embodiments, the computing device (600) may include one or more computer processor(s) (602), non-persistent storage (604) (e.g., volatile memory, such as RAM, cache memory), persistent storage (606) (e.g., an HDD, an optical drive such as a CD drive or a DVD drive, a Flash memory, etc.), a communication interface (612) (e.g., Bluetooth interface, infrared interface, network interface, optical interface, etc.), an input device(s) (610), an output device(s) (608), and numerous other elements (not shown) and functionalities. Each of these components is described below.

In one or more embodiments, the computer processor(s) (602) may be an integrated circuit for processing instructions. For example, the computer processor(s) (602) may be one or more cores or micro-cores of a processor. The computing device (600) may also include one or more input device(s) (610), such as a touchscreen, keyboard, mouse, microphone, touchpad, electronic pen, or any other type of input device. Further, the communication interface (612) may include an integrated circuit for connecting the computing device (600) to a network (e.g., a LAN, a WAN, Internet, mobile network, etc.) and/or to another device, such as another computing device.

In one or more embodiments, the computing device (600) may include one or more output device(s) (608), such as a screen (e.g., a liquid crystal display (LCD), plasma display, touchscreen, cathode ray tube (CRT) monitor, projector, or other display device), a printer, external storage, or any other output device. The output device(s) (608) may be the same or different from the input device(s) (610). The input and output device(s) may be locally or remotely connected to the computer processor(s) (602), non-persistent storage (604), and persistent storage (606). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for information extraction from an image-based asset, the method comprising:
generating, by an encoder, a plurality of image patches from the image-based asset, wherein the image-based asset comprises a plurality of pixels and each of the plurality of images patches comprises a non-overlapping set of pixels from the plurality of pixels;
generating, by the encoder, an input embedding for the at least one image patch, wherein the input embedding is a low-dimensional vector representation of the at least one image patch;
generating, by the encoder, an output embedding based on the input embedding,
wherein the output embedding is a high-dimensional vector representation of the at least one image patch that specifies a presence of a feature contained in at the least one image patch,
wherein the encoder comprises a convolutional neural network layer,
wherein the convolutional neural network layer processes the input embedding to generate the output embedding, and
wherein the convolutional neural network layer comprises a Fourier transform layer, wherein residual connections may be made after the Fourier transform layer, wherein the residual connections:
reduce risk of the Fourier transform layer losing key features when processing images; and
improve performance of the Fourier transform layer;
inferring, by a decoder, a detail of the image-based asset based on the output embedding and a formatted asset, wherein the output embedding is sent by the encoder, wherein the formatted asset is sent by a parser;
generating, by the decoder, a decoder output based on the detail, wherein the detail comprises at least the feature and a second feature;
converting, by a converter, the decoder output into an output asset, wherein the decoder output is sent by the decoder; and
sending, by the converter, the output asset to a user using a graphical user interface (GUI).

2. The method of claim 1, further comprising:
analyzing, by an annotator, the image-based asset to generate an annotated asset, wherein the annotated asset is a text file, wherein the annotated asset comprises at least the feature and information associated with the feature;
sending, by the annotator, the annotated asset to the parser; and converting, by the parser, the annotated asset into the formatted asset, wherein the formatted asset is a JavaScript Object Notation (JSON) file.

3. The method of claim 1, wherein the feature is at least one selected from a group consisting of an identifier of the image-based asset, an identifier of a vendor, an identifier of a customer, a purchase order number, a shipping address, a billing address, a unit price of a hardware component, a shape of a text included in the image-based asset, and layout information of the image-based asset.

4. The method of claim 1, wherein the encoder employs a linear projection model to generate the input embedding, wherein the low-dimensional vector representation of the at least one image patch reduces computation complexity that needs to be managed by the encoder.

5. The method of claim 1, wherein the decoder converts the output embeddings into a token sequence, wherein the token sequence comprises at least a start token and an end token, wherein the start token marks a beginning of the detail in the token sequence, wherein the end token marks an end of the detail in the token sequence.

6. The method of claim 1, wherein the decoder output is converted into the output asset using a regular expression model.

7. The method of claim 1, wherein the output asset comprises at least one selected from a group consisting of an identifier of the image-based asset, an identifier of a vendor, an identifier of a customer, a purchase order number, a shipping address, a billing address, and a unit price of a hardware component.

8. A non-transitory computer-readable medium comprising computer-readable program code, which when executed by a computer processor enables the computer processor to perform a method for information extraction from an image-based asset, the method comprising:
  generating, by an encoder, a plurality of image patches from the image-based asset, wherein the image-based asset comprises a plurality of pixels and each of the plurality of images patches comprises a non-overlapping set of pixels from the plurality of pixels;
  generating, by the encoder, an input embedding for the at least one image patch, wherein the input embedding is a low-dimensional vector representation of the at least one image patch;
  generating, by the encoder, an output embedding based on the input embedding,
    wherein the output embedding is a high-dimensional vector representation of the at least one image patch that specifies a presence of a feature contained in at the least one image patch,
    wherein the encoder comprises a convolutional neural network layer,
    wherein the convolutional neural network layer processes the input embedding to generate the output embedding, and
    wherein the convolutional neural network layer comprises a Fourier transform layer, wherein residual connections may be made after the Fourier transform layer, wherein the residual connections:
      reduce risk of the Fourier transform layer losing key features when processing images; and
      improve performance of the Fourier transform layer;
  inferring, by a decoder, a detail of the image-based asset based on the output embedding and a formatted asset, wherein the output embedding is sent by the encoder, wherein the formatted asset is sent by a parser;
  generating, by the decoder, a decoder output based on the detail, wherein the detail comprises at least the feature and a second feature; and
  sending, by the decoder, the decoder output to a user using a graphical user interface (GUI).

9. The non-transitory computer-readable medium of claim 8, further comprising:
  analyzing, by an annotator, the image-based asset to generate an annotated asset, wherein the annotated asset is a text file, wherein the annotated asset comprises at least the feature and information associated with the feature;
  sending, by the annotator, the annotated asset to the parser; and
  converting, by the parser, the annotated asset into the formatted asset, wherein the formatted asset is a JavaScript Object Notation (JSON) file.

10. The non-transitory computer-readable medium of claim 8, wherein the feature is at least one selected from a group consisting of an identifier of the image-based asset, an identifier of a vendor, an identifier of a customer, a purchase order number, a shipping address, a billing address, a unit price of a hardware component, a shape of a text included in the image-based asset, and layout information of the image-based asset.

11. The non-transitory computer-readable medium of claim 8, wherein the encoder employs a linear projection model to generate the input embedding, wherein the low-dimensional vector representation of the at least one image patch reduces computation complexity that needs to be managed by the encoder.

12. The non-transitory computer-readable medium of claim 8, wherein the decoder converts the output embeddings into a token sequence, wherein the token sequence comprises at least a start token and an end token, wherein the start token marks a beginning of the detail in the token sequence, wherein the end token marks an end of the detail in the token sequence.

13. A system for information extraction from an image-based asset, the system comprising:
  a processor comprising circuitry;
  memory comprising instructions, which when executed perform a method, the method comprising:
    generating, by an encoder, a plurality of image patches from the image-based asset, wherein the image-based asset comprises a plurality of pixels and each of the plurality of images patches comprises a non-overlapping set of pixels from the plurality of pixels;
    generating, by the encoder, an input embedding for the at least one image patch, wherein the input embedding is a low-dimensional vector representation of the at least one image patch;
    generating, by the encoder, an output embedding based on the input embedding,
      wherein the output embedding is a high-dimensional vector representation of the at least one image patch that specifies a presence of a feature contained in at the least one image patch,
      wherein the encoder comprises a convolutional neural network layer,
      wherein the convolutional neural network layer processes the input embedding to generate the output embedding, and
      wherein the convolutional neural network layer comprises a Fourier transform layer, wherein residual connections may be made after the Fourier transform layer, wherein the residual connections:

reduce risk of the Fourier transform layer losing key features when processing images; and improve performance of the Fourier transform layer;

inferring, by a decoder, a detail of the image-based asset based on the output embedding and a formatted asset, wherein the output embedding is sent by the encoder, wherein the formatted asset is sent by a parser;

generating, by the decoder, a decoder output based on the detail, wherein the detail comprises at least the feature and a second feature;

converting, by a converter, the decoder output into an output asset, wherein the decoder output is sent by the decoder; and sending, by the converter, the output asset to a user using a graphical user interface (GUI).

14. The system of claim 13, further comprising:

analyzing, by an annotator, the image-based asset to generate an annotated asset, wherein the annotated asset is a text file, wherein the annotated asset comprises at least the feature and information associated with the feature;

sending, by the annotator, the annotated asset to the parser; and converting, by the parser, the annotated asset into the formatted asset, wherein the formatted asset is a JavaScript Object Notation (JSON) file.

15. The system of claim 13, wherein the feature is at least one selected from a group consisting of an identifier of the image-based asset, an identifier of a vendor, an identifier of a customer, a purchase order number, a shipping address, a billing address, a unit price of a hardware component, a shape of a text included in the image-based asset, and layout information of the image-based asset.

* * * * *